(12) United States Patent  (10) Patent No.: US 7,660,667 B2
Furukawa  (45) Date of Patent: Feb. 9, 2010

(54) SYSTEM AND METHOD FOR OFF ROUTE PROCESSING

(75) Inventor: Hideo Furukawa, Southfield, MI (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/842,427

(22) Filed: Aug. 21, 2007

(65) Prior Publication Data

US 2007/0288162 A1 Dec. 13, 2007

Related U.S. Application Data

(63) Continuation of application No. 10/848,562, filed on May 19, 2004, now abandoned.

(51) Int. Cl.
*G08G 1/123* (2006.01)
*G01C 21/34* (2006.01)
*G01C 21/30* (2006.01)
*G01C 21/32* (2006.01)

(52) U.S. Cl. .............. 701/212; 701/210; 701/208; 340/995.1; 340/995.14; 340/995.27

(58) Field of Classification Search ........... 379/190, 379/191; 340/995.1, 995.11, 995.14, 995.15, 340/995.17, 995.19, 995.21, 995.27; 701/208, 701/212, 224, 210
See application file for complete search history.

(56) References Cited

U.S. PATENT DOCUMENTS

| | | | |
|---|---|---|---|
| 4,511,973 A | 4/1985 | Miura et al. | |
| 4,677,563 A | 6/1987 | Itoh et al. | |
| 5,121,326 A | 6/1992 | Moroto et al. | |
| 5,168,452 A | 12/1992 | Yamada et al. | |
| 5,187,810 A | 2/1993 | Yoneyama et al. | |
| 5,191,532 A | 3/1993 | Moroto et al. | |
| 5,270,937 A | 12/1993 | Link et al. | |
| 5,504,482 A | 4/1996 | Schreder | |
| 5,513,110 A | 4/1996 | Fujita et al. | |
| 5,699,255 A * | 12/1997 | Ellis et al. | 701/212 |
| 5,821,880 A | 10/1998 | Morimoto et al. | |
| 5,845,228 A | 12/1998 | Uekawa et al. | |
| 5,899,955 A | 5/1999 | Yagyu et al. | |
| 5,902,349 A | 5/1999 | Endo et al. | |
| 5,911,775 A | 6/1999 | Tanimoto | |

(Continued)

FOREIGN PATENT DOCUMENTS

EP 0777206 A1 6/1997

(Continued)

OTHER PUBLICATIONS

Office Action from U.S. Appl. No. 10/848,577 mailed May 4, 2005.

(Continued)

*Primary Examiner*—Thomas G Black
*Assistant Examiner*—Christine M Behncke
(74) *Attorney, Agent, or Firm*—Plumsea Law Group, LLC; Mark E. Duell

(57) ABSTRACT

A system and method for off route processing is disclosed. The system and method can be used to provide information when an off route condition occurs. The system and method can include provisions to make modifications in the way navigation information is displayed. The system and method can also provide a selectable re-route mode and selectable re-route information.

22 Claims, 27 Drawing Sheets

U.S. PATENT DOCUMENTS

| | | |
|---|---|---|
| 5,925,091 A | 7/1999 | Ando |
| 5,987,381 A | 11/1999 | Oshizawa |
| 6,067,502 A | 5/2000 | Hayashida et al. |
| 6,181,987 B1 | 1/2001 | Deker et al. |
| 6,292,743 B1 | 9/2001 | Pu et al. |
| 6,292,745 B1 | 9/2001 | Robare et al. |
| 6,307,485 B1 * | 10/2001 | Hasegawa ............ 340/995.15 |
| 6,317,682 B1 | 11/2001 | Ogura et al. |
| 6,320,518 B2 * | 11/2001 | Saeki et al. ........... 340/995.12 |
| 6,324,467 B1 | 11/2001 | Machii et al. |
| 6,343,301 B1 | 1/2002 | Halt et al. |
| 6,351,708 B1 | 2/2002 | Takagi et al. |
| 6,356,836 B1 | 3/2002 | Adolph |
| 6,374,177 B1 | 4/2002 | Lee et al. |
| 6,381,535 B1 | 4/2002 | Durocher et al. |
| 6,434,481 B2 | 8/2002 | Winter et al. |
| 6,453,233 B1 | 9/2002 | Kato |
| 6,507,850 B1 | 1/2003 | Livshutz et al. |
| 6,526,284 B1 | 2/2003 | Sharp et al. |
| 6,604,038 B1 * | 8/2003 | Lesesky et al. ................. 701/49 |
| 6,622,083 B1 * | 9/2003 | Knockeart et al. .......... 701/202 |
| 6,636,799 B2 | 10/2003 | D'Amico et al. |
| 6,691,028 B2 | 2/2004 | Bullock et al. |
| 6,691,128 B2 | 2/2004 | Natesan et al. |
| 6,714,863 B2 * | 3/2004 | Katayama et al. .......... 701/209 |
| 6,725,154 B2 * | 4/2004 | Kamikawa et al. .......... 701/208 |
| 6,738,711 B2 | 5/2004 | Ohmura et al. |
| 6,747,597 B2 | 6/2004 | Choi |
| 6,862,500 B2 | 3/2005 | Tzamaloukas |
| 6,873,905 B2 * | 3/2005 | Endo et al. .................. 701/202 |
| 6,892,132 B2 * | 5/2005 | Nagamune .................. 701/208 |
| 6,917,878 B2 | 7/2005 | Pechatnikov et al. |
| 6,922,583 B1 | 1/2006 | Muramatsu |
| 7,027,916 B2 | 4/2006 | Furukawa |
| 2001/0029429 A1 * | 10/2001 | Katayama et al. ........... 701/209 |
| 2002/0029224 A1 * | 3/2002 | Carlsson .................. 707/104.1 |
| 2002/0077745 A1 | 6/2002 | Ohmura et al. |
| 2002/0099481 A1 | 7/2002 | Mori |
| 2002/0128768 A1 | 9/2002 | Nakano et al. |
| 2003/0046331 A1 | 3/2003 | O'Donnell |
| 2003/0060974 A1 | 3/2003 | Miyahara et al. |
| 2003/0115081 A1 | 6/2003 | Ohtomo |
| 2003/0120423 A1 | 6/2003 | Cochlovius et al. |
| 2003/0158651 A1 | 8/2003 | Matsuo et al. |
| 2003/0191580 A1 | 10/2003 | Endo et al. |
| 2003/0236617 A1 | 12/2003 | Yamada et al. |
| 2004/0001720 A1 | 1/2004 | Krill et al. |
| 2004/0093155 A1 | 5/2004 | Simonds et al. |
| 2004/0169653 A1 | 9/2004 | Endo et al. |
| 2004/0203779 A1 | 10/2004 | Gabara |
| 2004/0204848 A1 | 10/2004 | Matsuo et al. |
| 2004/0260458 A1 | 12/2004 | Park et al. |
| 2005/0137789 A1 | 6/2005 | Furukawa |
| 2005/0209774 A1 | 9/2005 | Finlay |
| 2006/0080030 A1 | 4/2006 | Okude et al. |
| 2006/0106534 A1 * | 5/2006 | Kawamata et al. .......... 701/208 |
| 2007/0005233 A1 | 1/2007 | Pinkus et al. |
| 2007/0219715 A1 * | 9/2007 | Uyeki et al. ................. 701/209 |

OTHER PUBLICATIONS

Response to Office Action filed on Aug. 4, 2005 from U.S. Appl. No. 10/848,577.

Notice of Allowance mailed Nov. 4, 2005 from U.S. Appl. No. 10/848,577.

* cited by examiner

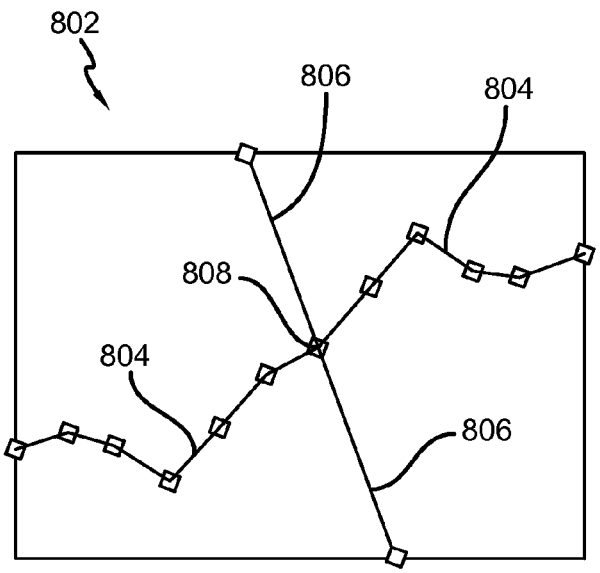
FIG. 7
FIG. 8
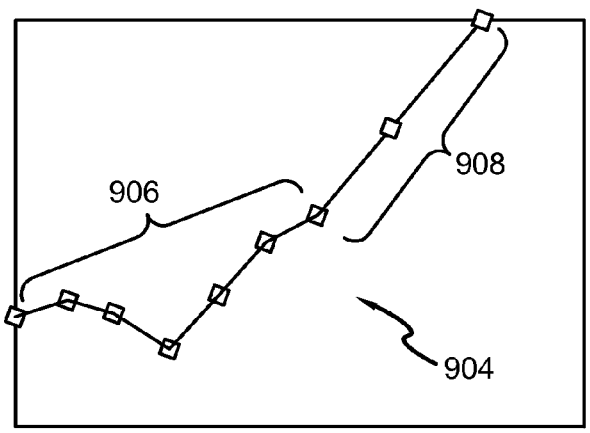
FIG. 9

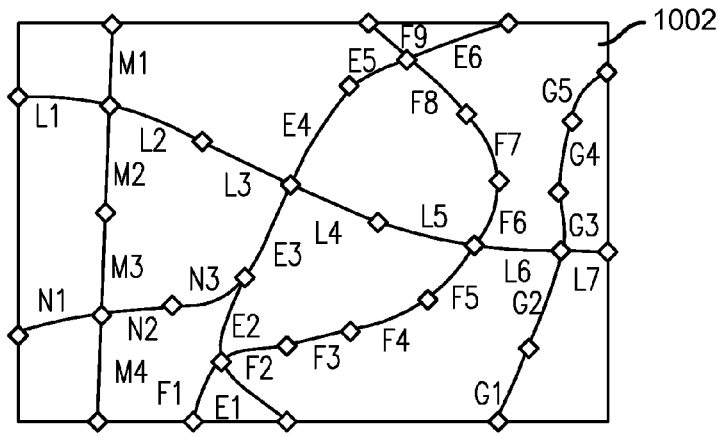
FIG. 10
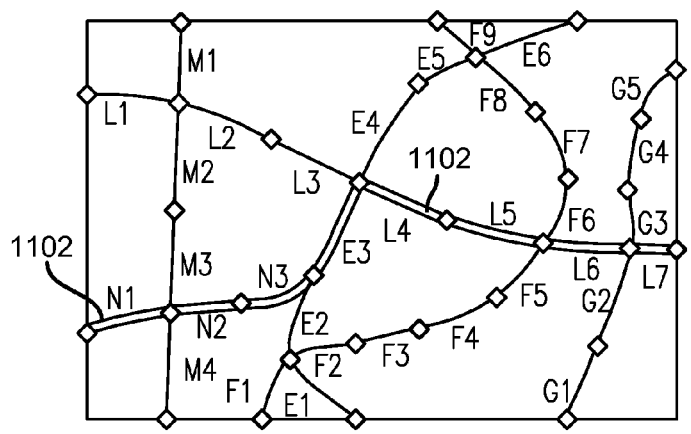
FIG. 11
FIG. 12
| PARCEL | 6 | E1 | E2 | E3 | E4 | E5 | E6 | | | |
| --- | --- | --- | --- | --- | --- | --- | --- | --- | --- | --- |
| | 9 | F1 | F2 | F3 | F4 | F5 | F6 | F7 | F8 | F9 |
| | 5 | G1 | G2 | G3 | G4 | G5 | | | | |
| | 7 | L1 | L2 | L3 | L4 | L5 | L6 | L7 | | |
| | 4 | M1 | M2 | M3 | M4 | | | | | |
| | 3 | N1 | N2 | N3 | | | | | | |
| ROUTE | 8 | N1 | N2 | N3 | |
| --- | --- | --- | --- | --- | --- |
| | | E3 | | | |
| | | L4 | L5 | L6 | L7 |
FIG. 13
| PARCEL | | | | | | | | | | |
| --- | --- | --- | --- | --- | --- | --- | --- | --- | --- | --- |
| ROUTE | 8 | N1 | N2 | N3 | | | | | | |
| | | E3 | | | | | | | | |
| | | L4 | L5 | L6 | L7 | | | | | |
| NON-ROUTE | 2 | E1 | E2 | | | | | | | |
| | 3 | E4 | E5 | E6 | | | | | | |
| | 9 | F1 | F2 | F3 | F4 | F5 | F6 | F7 | F8 | F9 |
| | 5 | G1 | G2 | G3 | G4 | G5 | | | | |
| | 3 | L1 | L2 | L3 | | | | | | |
| | 4 | M1 | M2 | M3 | M4 | | | | | |
FIG. 14

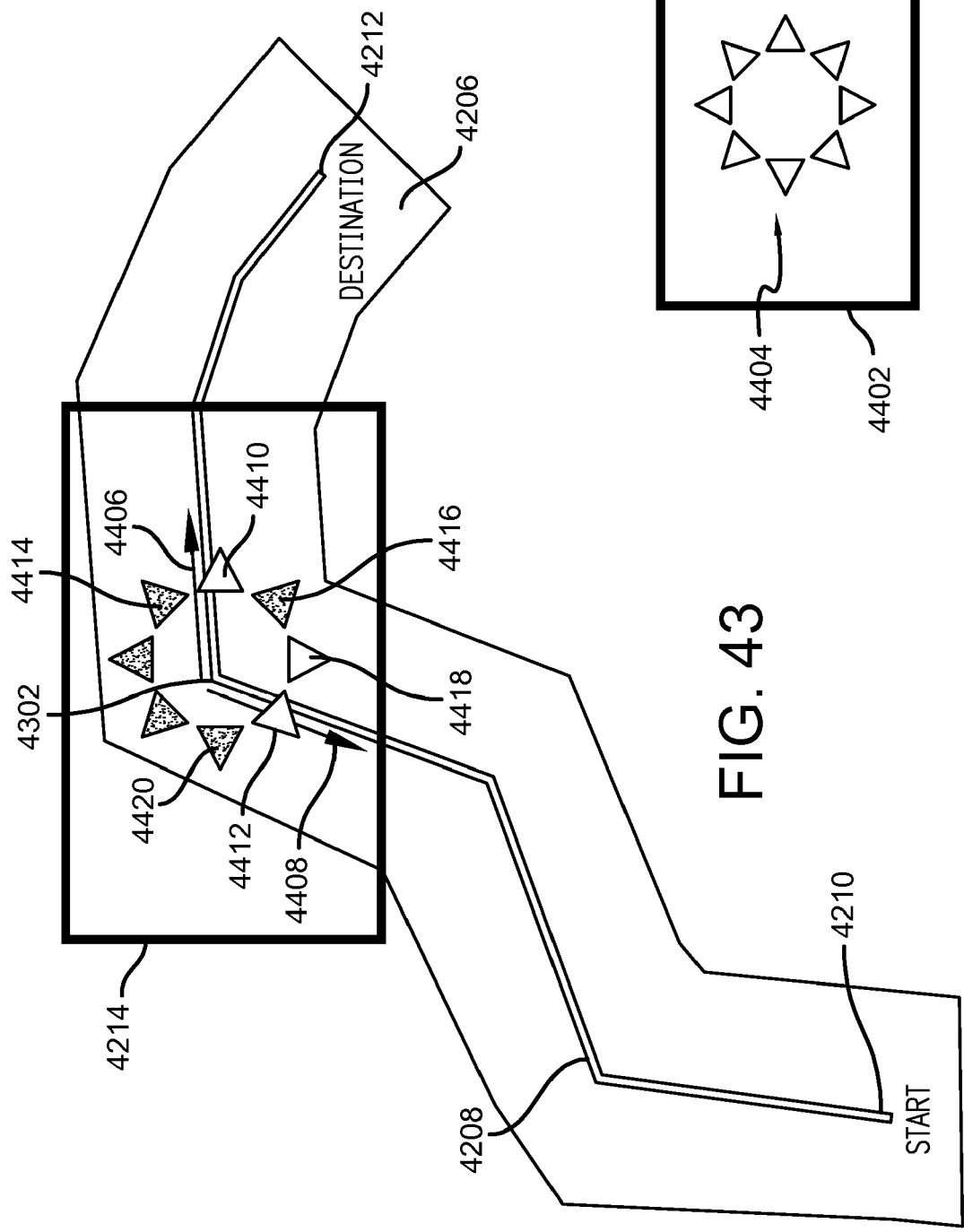

SYSTEM AND METHOD FOR OFF ROUTE PROCESSING

CROSS REFERENCE TO RELATED APPLICATIONS

This application is a continuation of U.S. application Ser. No. 10/848,562, filed on May 19, 2004. This patent application is hereby incorporated by reference in its entirety.

BACKGROUND

1. Field of the Invention

This invention relates to the field of navigation, and more particularly, to a system and method for off route processing.

2. Related Art

Currently, some motor vehicles include provisions for providing navigation information and driving directions to the driver. These navigation systems generally comprise a system that is built into a motor vehicle. These systems are usually designed so that, after leaving the factory, the systems are self-contained units. And all of the navigation information that is available to direct a driver to a particular destination is contained within the system.

All of this information usually requires considerable computer resources to store, search and manage all of the data. Large storage capacity, fast processors, large amounts of memory and other costly computer equipment are all required to manage and process all of the navigation equipment.

While this arrangement does provide navigation assistance, there are a number of drawbacks. First, current systems are expensive. In many cases, current navigation systems can significantly increase the cost of purchasing a motor vehicle. Also, updating the system is cumbersome and expensive.

Some systems are incapable of receiving updates. For systems, all of the navigation information initially programmed is all that is ever available. These systems cannot assist users in finding a destination that is located on a new street or new development. Some systems are updated by installing or replacing a new storage medium. In some cases, a high capacity storage medium like an optical disk, for example a CD or DVD-ROM, is inserted. In some other cases, a new optical disk containing updates replaces the existing optical disk. While these systems are capable of receiving updates, providing these new optical disks is expensive and cumbersome. The proprietor must produce and create a new optical disk with the updated information and distribute the optical disk. Users must purchase or obtain the disk and install the updated information. Because of the cost and inconvenience associated with this process, updates practical are only about once a year.

There is currently a need for a system that is less expensive and can be easily updated. There is also a need for a system that can deliver navigation information using existing infrastructure and can deliver navigation information in real time.

SUMMARY

A method of delivering and navigation information is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a system for displaying navigation information comprising a display including a region, the region providing a visible portion of the display and displaying a map and an indicia, the indicia representing a motor vehicle; the system having a first condition wherein the indicia is on a route and wherein the indicia remains at a substantially fixed position with respect to the region; the system having a second condition where the indicia is spaced from the route and wherein a modification is made to keep the route and the indicia within the region.

In another aspect, the modification includes a change in scale of the map.

In another aspect, the scale is increased to show a larger geographical area as the indicia moves further away from the route.

In another aspect, the scale is decreased to show a smaller geographical area as the indicia moves closer to the route.

In another aspect, the scale is returned to an original scale when the indicia returns to the route.

In another aspect, the modification includes movement of the indicia from the fixed position.

In another aspect, the indicia returns to the fixed position when the indicia returns to the route.

In another aspect, the invention provides a method for providing navigation information comprising the steps of: retrieving information related to a selected re-route mode, sensing an off route condition and executing an off route process based on the selected re-route mode and in response to the off route condition.

In another aspect, re-route information is prepared if an automatic mode is the selected re-route mode.

In another aspect, a query is sent if an inquire mode is the selected re-route mode.

In another aspect, the query is configured to be sent to a user and asks the user if re-route information is needed.

In another aspect, the re-route information is prepared if the user requests the re-route information.

In another aspect, the re-route information is not prepared if the user does not request the re-route information.

In another aspect, the method waits for a request for the re-route information if a manual mode is selected as the re-route mode.

In another aspect, the re-route information is prepared if the user requests the re-route information.

In another aspect, the re-route information is not prepared if the user does not request the re-route information.

In another aspect, the invention provides a method for processing an off-route condition and providing re-route directions comprising the steps of: receiving information related to an off-route condition from an on board unit that is associated with a motor vehicle, receiving information related to the position of the motor vehicle, preparing re-route directions, and sending the re-route directions to the on board unit.

In another aspect, a distance to a destination is a factor that is considered in preparing the re-route directions.

In another aspect, a distance to a route is a factor that is considered in preparing the re-route directions.

In another aspect, simplicity of the re-route directions is a factor that is considered in preparing the re-route directions.

In another aspect, a user preference is a factor that is considered in preparing the re-route directions.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 is a schematic diagram of a preferred embodiment of a map with regions.

FIG. 8 is a schematic diagram of a preferred embodiment of a map with map features.

FIG. 9 is a schematic diagram of a preferred embodiment of a map with map features.

FIG. 10 is a schematic diagram of a preferred embodiment of an example map.

FIG. 11 is a schematic diagram of a preferred embodiment of an example map with an example route.

FIG. 12 is a schematic diagram of a preferred embodiment of map information.

FIG. 13 is a schematic diagram of a preferred embodiment of route information.

FIG. 14 is a schematic diagram of a preferred embodiment of map and route information.

FIG. 43 is a schematic diagram of a preferred embodiment of a map.

FIG. 44 is a schematic diagram of a preferred embodiment of a controllable indicia.

DETAILED DESCRIPTION OF THE PREFERRED EMBODIMENT(S)

Figure 1:
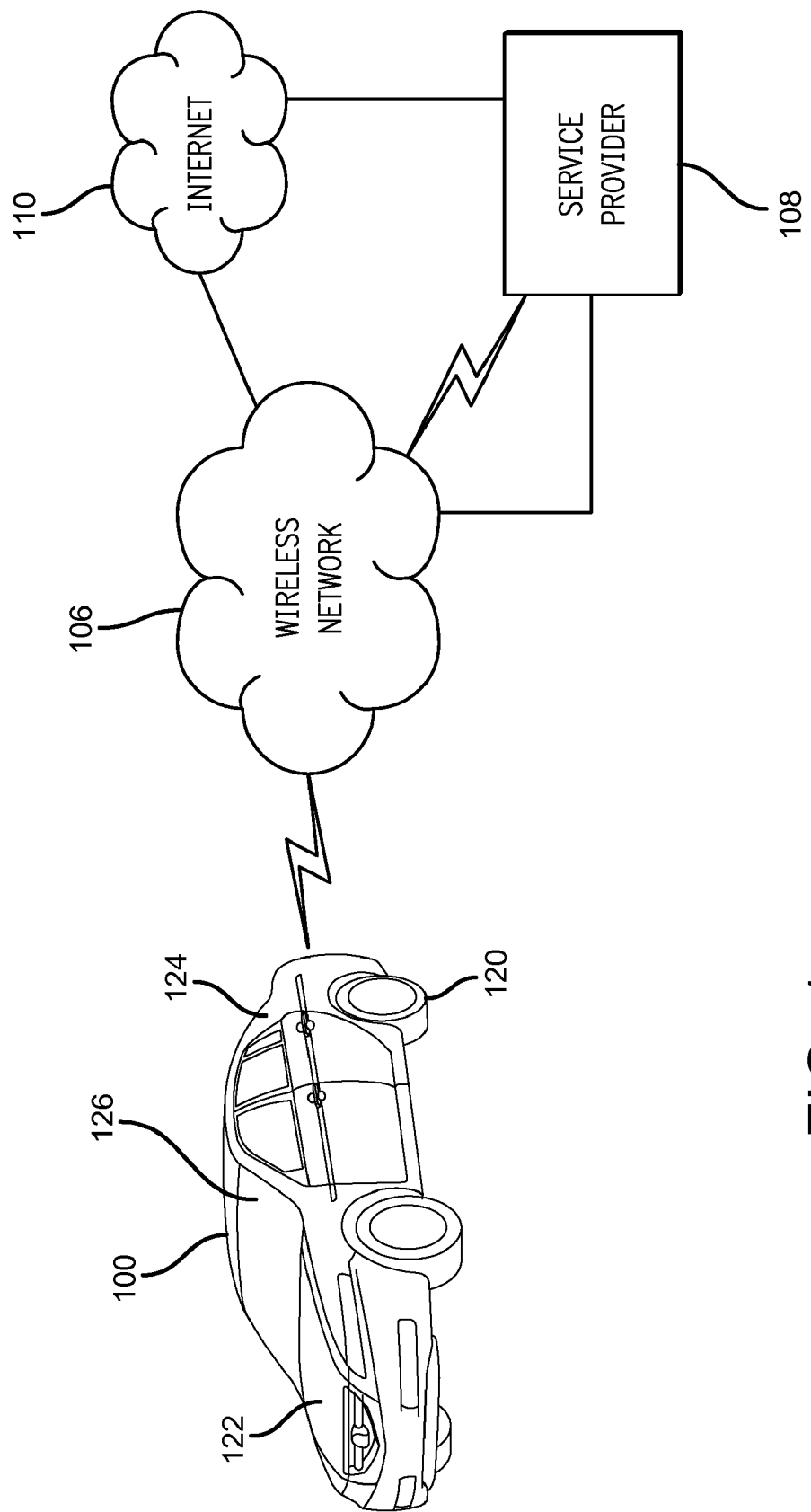
FIG. 1 is a schematic diagram of a preferred embodiment of a vehicle in association with a wireless communication system and a service provider.

FIG. 1 is a schematic view of an illustrative embodiment of a motor vehicle 100 along with various communications and computer resources, including a wireless communications network 106. Wireless network 106 can be any kind of wireless network, including but limited to any cellular telephone network using, for example, any one of the following standards: CDMA, TDMA, GSM, AMPS, PCS, analog, and/or W-CDMA.

In some embodiments, a service provider 108 communicates with motor vehicle 100. A wireless network 106 can be used facilitate communications between service provider 108 and motor vehicle 100. Service provider 108 can communicate with wireless network 106 in a number of different ways. In some embodiments, service provider 108 communicates with wireless network 106 wirelessly. In other embodiments, service provider 108 is directly connected to one or more elements of wireless network 106, and in still other embodiments, service provider 108 communicates with wireless network 106 by using the Internet 110. In some embodiments, service provider 108 can use more than one method of communicating with wireless network 106 or use other methods as back-ups.

Motor vehicle 100 also includes at least one wheel 120 adapted to contact a road surface, an engine 122, a body or chassis 124 and a passenger cabin 126, which is adapted to accommodate at least one human passenger.

Figure 2:
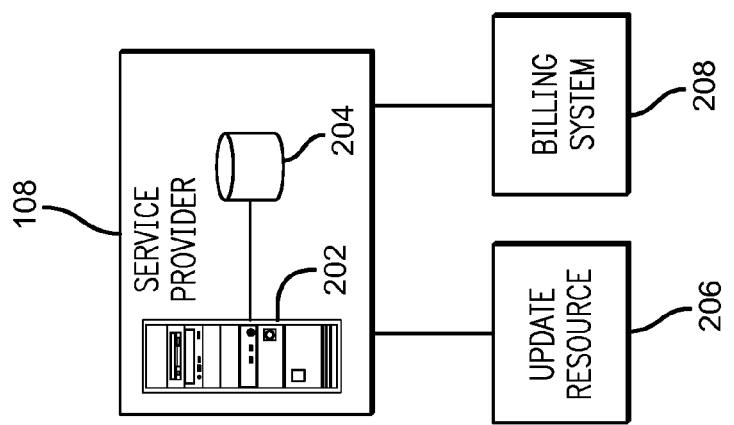
FIG. 2 is a schematic diagram of a preferred embodiment of a service provider in association with an update resource and a billing system.

FIG. 2 is a schematic diagram of a preferred embodiment of a service provider 108. In some embodiments, service provider 108 can include a computer system 202 and a database 204 in communication with computer system 202. The term "computer system" refers to the computing resources of a single computer, a portion of the computing resources of a single computer, and/or two or more computers in communication with one another, also any of these resources can be operated by one or more human users. In a preferred embodiment, computer system 202 includes a server.

Computer system 202 preferably communicates with database 204. Database 204 can include any kind of storage device, including but not limited magnetic, optical, magneto-optical, and/or memory, including volatile memory and non-volatile memory. In some embodiments, database 204 is integral with computer system 202 and in other embodiments, database 204 is separate from computer system 202 and communicates with computer system 202. In some embodiments, database 204 is used to store navigation information.

The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

In some embodiments, an update resource 206 is in communication with service provider 108. Update resource 206 can provide updates, revisions, edits and other modifications to service provider 108. In some cases, update resource 206 provides updated navigation information. In some embodiments, update resource 206 provides automated updates. In some embodiments, update resource provides periodic updates.

Some embodiments include a billing system 208 in communication with service provider 108. Billing system 208 can include account information for users and can interact with service provider 108 to prepare and generate bills. Billing system 208 can provide electronic billing or traditional billing by mail. In some embodiments, billing system 208 is a part of service provider 108 and billing system 208 uses resources associated with service provider 108. In other embodiments, billing system 208 is separate from service provider 108 and communicates with service provider 108.

Billing system 208 can interact with service provider 108 in a number of different ways. In some embodiments, billing system 208 operates on a transactional basis. In this mode, billing system 208 keeps track of a subscriber's use of service provider 108. In some cases, billing system 208 tracks or stores particular transactions or events associated with those transactions. For example, in one embodiment, billing system 208 tracks or stores requests for navigation information. These requests for navigation information can be related to a particular transaction, and billing system 208 can use these requests to track or store information related to the transaction. Billing system 208 can associate those requests with a subscriber and create a bill entry.

In some embodiments, billing system 208 tracks or stores the length of time a subscriber uses or interacts with service provider 108. In this embodiment, billing system 108 tracks or stores how long a subscriber uses are interacts with service provider 108. In some cases, a discreet measure of time, for example, a minute or any fraction or multiple, can be used to record or track a subscriber's use or interaction with service provider 108. This measure of time can be used to compute a fee and prepare a bill entry.

In some embodiments, subscribers are permitted to use or interact with service provider 108 any number of times for a set duration. For example, it is possible for subscribers to have weekly, monthly, quarterly or annual agreements with service provider 108 so that, during those agreed to periods, subscribers can use or interact with service provider 108 as often as they choose. Other durations of time can also be established. In some of these cases, subscribers have unlimited access to service provider 108 for that pre-selected duration of time. In other cases, subscribers have certain unlimited basic usage rights for that duration of time, but must pay additional fees for premium services.

One or more of the different types of billing arrangements can be used for a particular subscriber. It is also possible to provide one type of billing arrangement to one subscriber while providing a different billing arrangement to another subscriber.

Billing system 208 and service provider 108 can communicate with one another to manage subscriber access and to assist in preparing bills to subscribers. In some embodiments, billing system 208 can retrieve information from service provider 108 to create bill entries or entire bills. However, it is also possible for service provider to send information to billing system 208 related to a subscriber's activities so that billing system 208 can create bill entries or entire bills.

In some cases, service provider 108 will request information or permission from billing system 208 before preparing navigation information. In these cases, service provider 108 sends a request for permission to billing system 208 after a request for navigation information has been received from a subscriber. After receiving the request for permission from service provider 108, billing system 208 can determine if the subscriber has a valid account. In some cases, a valid account is an account that is not overdue, an account that has been pre-paid, or an account with an associated credit card. If the account is valid for some reason, billing system 208 provides permission to service provider or can inform service provider 108 that the subscriber's account is valid. After receiving permission, service provider 108 continues to process the subscriber's request and eventually respond to the subscriber.

Either or both service provider 108 or billing system 208 can use a number of different techniques to insure that the proper party is billed for various transactions. In one embodiment, information related to an On-Board Unit (disclosed below) is used to associate a particular transaction, interaction or subscription with a particular account. In another embodiment, information related to a wireless network is used to associate a particular transaction, interaction or subscription with a particular account. Some examples of information related to a wireless network include the following: Mobile Identification Number (MIN), calling party's number, Electronic or Equipment Identifier (EID), and/or Electronic Serial Number (ESN).

Figure 3:
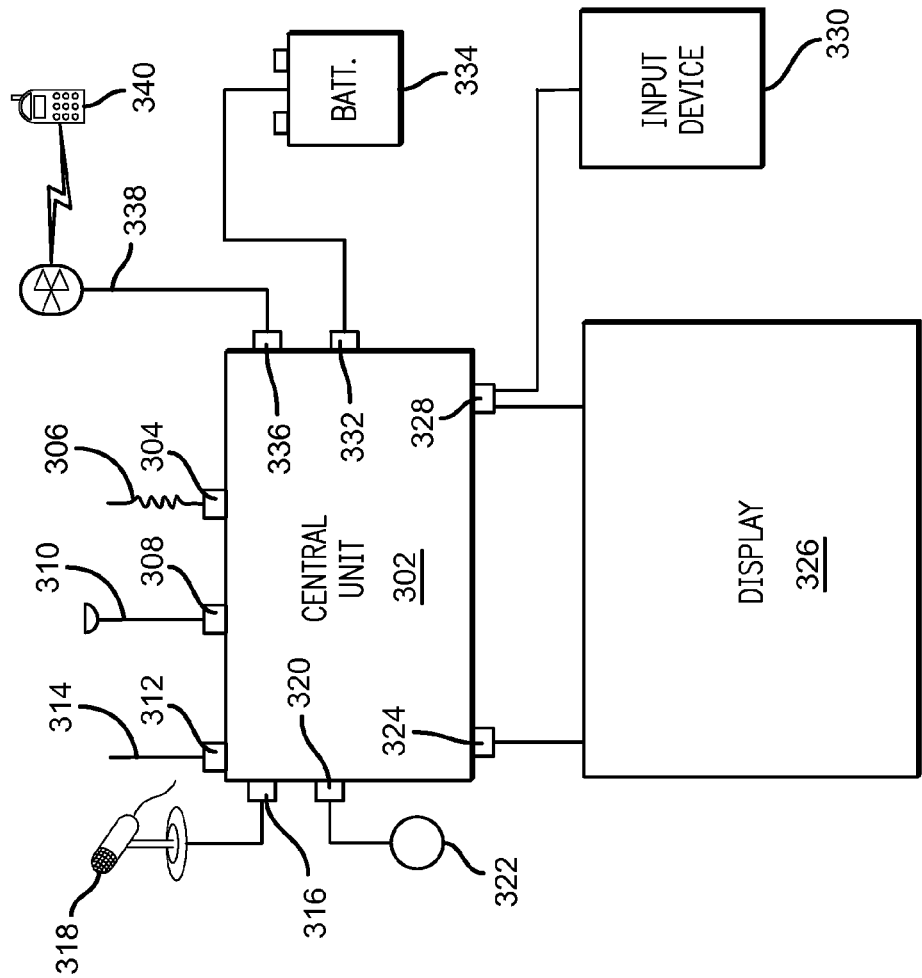
FIG. 3 is a schematic diagram of a preferred embodiment of a central unit and associated components.

FIG. 3 is a schematic diagram of several devices that are associated with motor vehicle 100. Central unit 302 can include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with central unit 302 are optional. Some embodiments may include a given port or associated provision, while others may exclude it. The following description discloses many of the possible parts and provisions that can be used, however, it should be kept in mind that not every part or provision must be used in a given embodiment. Central unit 302 includes a wireless network antenna port 304 that is designed to receive information from a wireless network antenna 306, a GPS antenna port 308 designed to receive information from a GPS antenna 310, a radio antenna port 312 designed to receive information from a radio antenna 314.

Central unit 302 can also include a number of items that facilitate human interaction. To receive vocal information from a user, central unit 302 can include a microphone port 316 that is capable of communicating with a microphone 318. Central unit 302 can also include an audio port 320 that is designed to send audio information to one or more speakers 322 or audio devices. In some embodiments, microphone port 312 and audio port 316 are conductors associated with a single physical connector. For example, microphone port 312 and audio port 316 can be female conductors of a multi-channel coaxial plug, like a standard 2.5 mm headset plug.

In order to provide visual information to a user, central unit 302 can include a display port 324 that is capable of interacting with a display device 326. To receive input from a user, central unit 302 can include an input port 328. Input port 328 can communicate with input device 330. In some embodiments, display device 326 can also receive input from a user. In some embodiments, display device 326 includes a touch screen that can receive input and in other embodiments, display device 326 includes a number of buttons that can receive input. In some embodiments, display device 326 includes both a touch screen and buttons. As shown in FIG. 3, user input received by display device 326 can also communicate with input port 328.

A power port 332 can connect central unit 302 to a power supply 334. In the embodiment shown in FIG. 3, power supply 334 is a battery.

Central unit 302 can also include provisions to communicate with a wireless telephone. Any system can be used to facilitate this communication with a wireless telephone; however, a low power radio frequency system is preferred. In an exemplary embodiment, a wireless local or personal area network using the Bluetooth® protocol is used to facilitate communication with a wireless telephone. In the exemplary embodiment shown in FIG. 3, central unit 302 includes a local wireless network antenna port 336 that is designed to communicate with a local wireless network antenna 338, which in turn, is designed to communicate wirelessly with wireless telephone 340.

Referring to FIGS. 1 and 3, there are two ways in which central unit 302 can communicate with wireless network 106. In some embodiments, central unit 302 includes provisions that permit central unit 302 to act as a wireless telephone. In these embodiments, central unit 302 communicates directly with wireless network 106 and can use wireless network antenna port 304 and wireless network antenna 306 to assist with this communication. In other embodiments, central unit 302 communicates with wireless telephone 340, which in turn, communicates with wireless network 106. In these other embodiments, central unit 302 can use local wireless antenna port 336 and associated local wireless network antenna 338 to assist in facilitating communications with wireless telephone 340. One or both of these methods can be used by central unit 302 to communicate with wireless network 106.

Central unit 302 can also include memory, data storage provisions including one or more databases and/or one or more processors.

In some embodiments, all or most of the items shown in FIG. 3 are housed in a single case or unit. In other embodiments, the various items shown in FIG. 3 are not housed in a single physical case, but instead, are distributed throughout motor vehicle 100 (see FIG. 1) and communicate with one another via known wired or wireless methods. For example, in a system where one or more items communicate wirelessly, the Bluetooth® protocol can be used.

Figure 4:
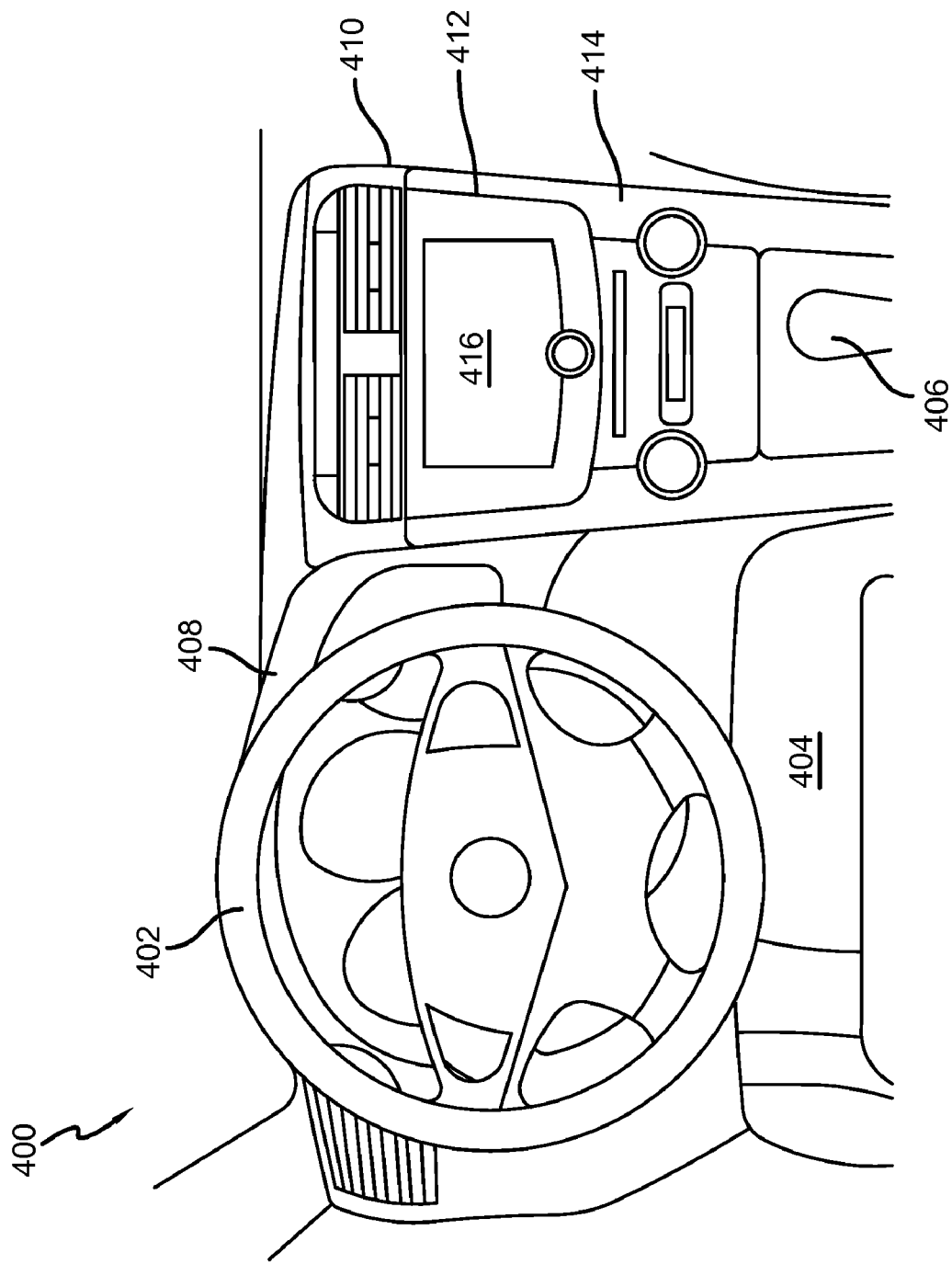
FIG. 4 is a schematic diagram of the interior of the vehicle shown in FIG. 1.

FIG. 4 is a preferred embodiment of an interior 400 of passenger cabin 126 of motor vehicle 100 (see FIG. 1). Interior 400 includes steering wheel 402, driver's seat 404, shifter or gear selector 406, dashboard 408 and center console 410. Center console 410 includes an upper portion 412 and a lower portion 414. In some embodiments, lower portion 414 includes radio and/or audio controls. Preferably, upper portion 412 includes display 416. In some embodiments, upper portion 412 includes a multi-function unit that can communicate or control an audio system, a climate control system and/or a navigation system.

In an exemplary embodiment, display 416 is used as display device 326, shown schematically in FIG. 3. Also in the exemplary embodiment, central unit 302 or portions of central unit 302 is disposed behind display 416. In some embodiments, display 416 can include a touch screen and in some embodiments, buttons can be disposed next to display 416.

In one embodiment, central unit 302 includes provisions that allow central unit 302 to act as a hands free telephone system. In this regard, microphone 314 can be placed in a discreet and somewhat hidden location in passenger cabin 126 (see FIG. 1) of motor vehicle 100 (see FIG. 1). Other components are preferably placed out of plain sight.

Figure 5:
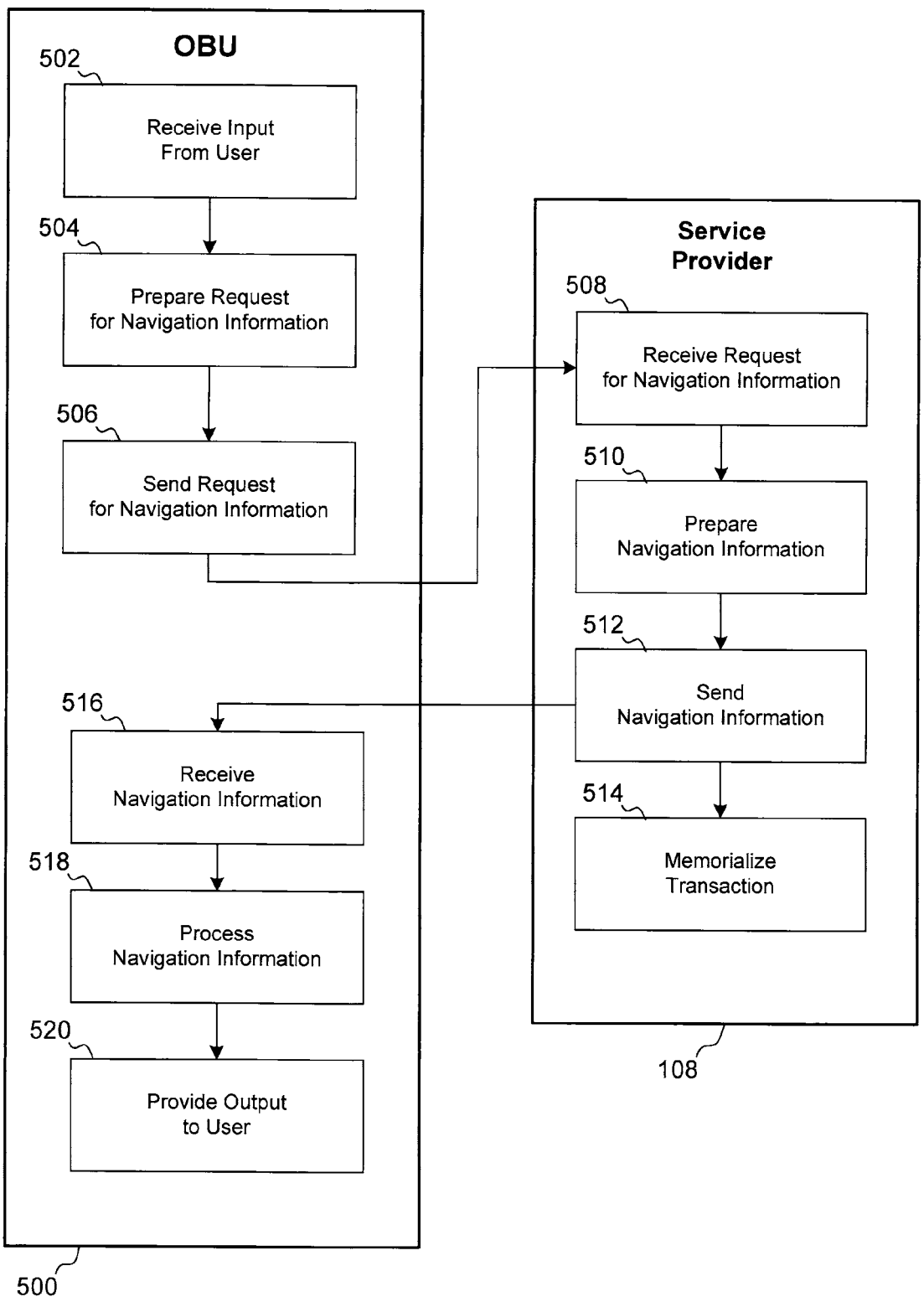
FIG. 5 is a flow diagram of a preferred embodiment of a method for requesting and receiving navigation information.

Some embodiments provide a system and method managing navigation information. FIG. 5 is a flow diagram of a preferred embodiment of a system and method for managing navigation information.

In the embodiment shown in FIG. 5, certain steps are associated with On-Board Unit (referred to as "OBU") 500 and certain steps are associated with service provider 108. Preferably, those steps associated with OBU 500 are performed on or by OBU 500 and those steps associated with service provider 108 are performed on or by service provider 108. However, this is not necessarily the case, and those steps associated with OBU 500 can be performed on or by service provider 108 or some other resource, and those steps associated with service provider 108 can be performed on or by OBU 500 or some other resource.

OBU 500 is a device or provision associated with motor vehicle 100. In some embodiments, OBU 500 includes provisions that permit OBU 500 to receive information. In some embodiments, OBU 500 can store information in a memory or computer readable media. In some embodiments, OBU 500 includes provisions that permit OBU 500 to process information. In some embodiments, OBU 500 includes provisions that permit OBU 500 to display information. In some embodiments, OBU 500 includes provisions that permit OBU 500 to receive information from a user. In some embodiments, OBU 500 includes provisions that permit OBU 500 to receive information from a wireless network. In some embodiments, OBU 500 includes provisions that permit OBU 500 to interact with a user. In some embodiments, OBU 500 includes a combination of two or more of the above provisions.

Different embodiments can include different elements or features. For simplicity, the term, "On-Board Unit" (OBU) is used to refer to those elements or components that are associated with motor vehicle 100 (see FIG. 1) for a particular embodiment. In an exemplary embodiment, OBU 500 comprises one or more facilities of central unit 302 (see FIG. 3). OBU can also include one or more of the items shown in FIG. 3, for example, central unit 302, display 326, and/or input device 330.

Preferably, as shown in FIG. 5, the process begins when an input is received in step 502. Any form of input can be received in step 502. In some cases, the input is in the form of one or more buttons being pressed, and/or interaction with a touch screen associated with display device 326 (see FIG. 3). In some cases, a combination of input from buttons and/or touch screen interaction is received.

It is also possible for voice information to be received in step 502. Any known speech recognition process or program can be utilized to convert spoken words, phrases and/or numbers into a machine readable format. Preferably, the IBM® embedded Via Voice speech recognition engine is used.

In step 504, OBU 500 analyzes and processes the information received in step 502 and prepares a request for navigation information. In step 506, OBU 500 sends a request for navigation information. In step 508, service provider 108 receives a request for navigation information. In step 510, service provider 108 analyzes and processes the request for navigation information and prepares a response to the request. In step 512, service provider 108 sends the requested navigation information to OBU 500.

Step 514 is an optional step. In step 514, service provider memorializes the transaction. In some embodiments, the request is memorialized, in other embodiments, the response is memorialized and in still other embodiments, both the request and the response are memorialized. It is also possible to include time, date and location stamps. This memorialized information can be used to interact with billing system 208 (see FIG. 2).

Figure 15:
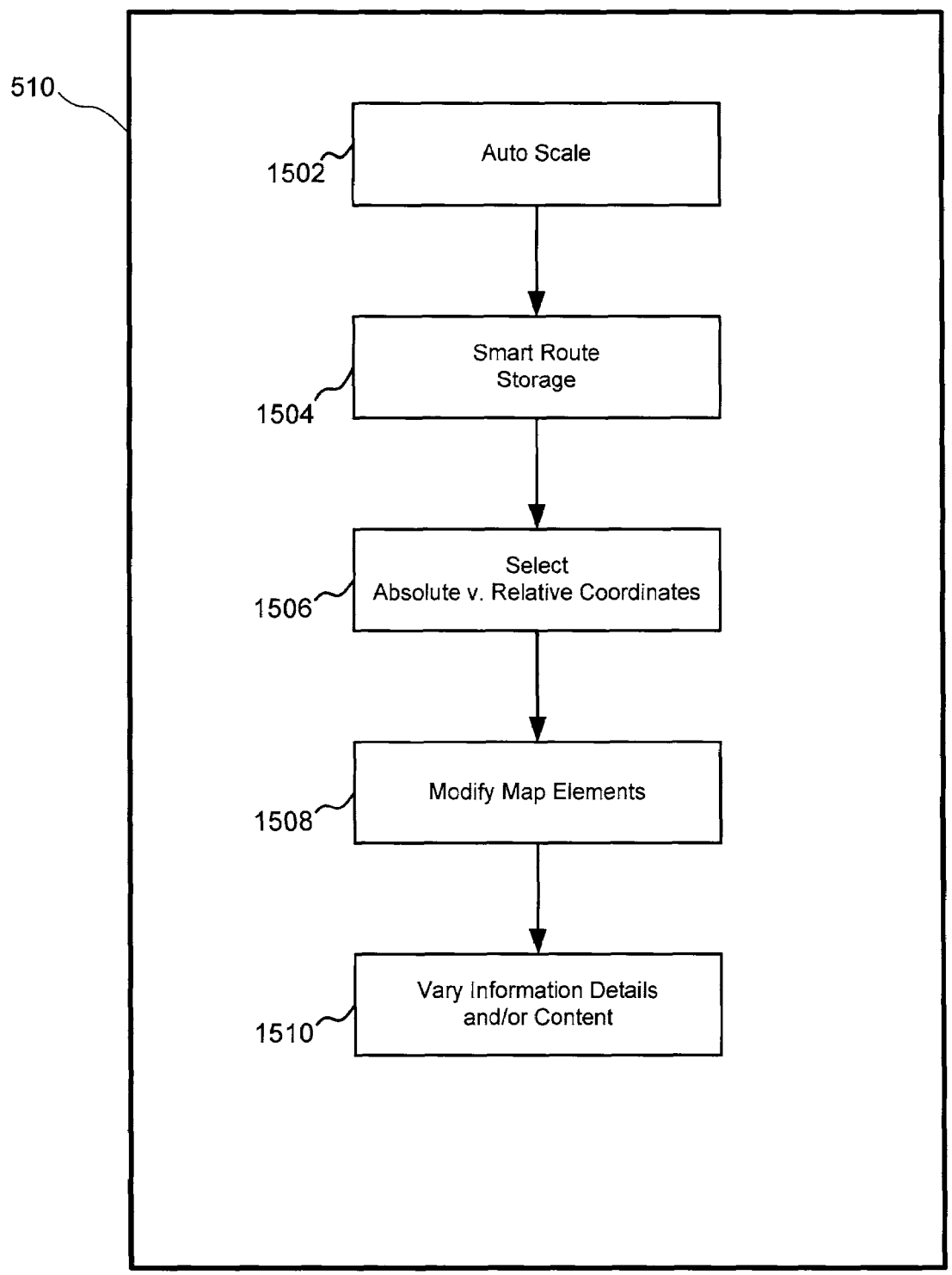
FIG. 15 is a flow diagram of a preferred embodiment of step 510 shown in FIG. 5.

In some embodiments, service provider 108 can prepare navigation information for delivery. Preferably, this preparation step occurs in step 510 after a request for navigation services has been received. One or more different processes or techniques can be used to prepare navigation information for delivery. FIG. 15, which is a flow diagram of a preferred embodiment of step 510, shows several processes that can be used by service provider 108. In the embodiment shown in FIG. 15, some of the processes include auto scale 1502, smart route storage 1504 and select absolute or relative coordinates 1506. In some embodiments, one of the processes is used. In other embodiments, two or more processes are used, and in still other embodiments, all of the processes are used. Furthermore, the various process steps can occur in any desired order.

Figure 6:
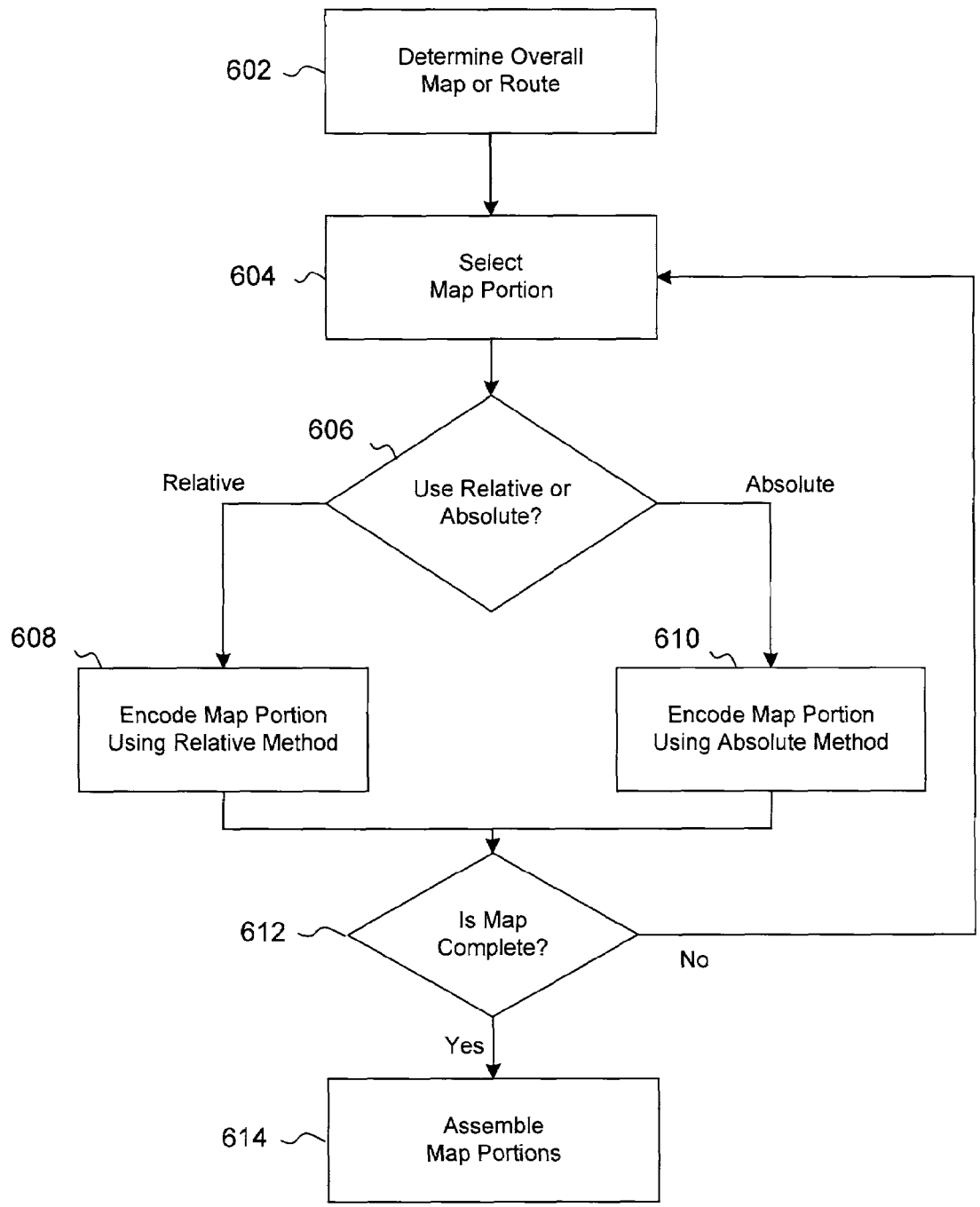
FIG. 6 is a flow diagram of a preferred embodiment of a method for assembling a map.

The process to prepare navigation information 510 can include one or more steps or processes. One of these processes is a process where different elements of a map are encoded or expressed using absolute or relative coordinates. FIG. 6 is a flow diagram of a preferred embodiment of a method for preparing navigation information. This method can be used alone or in conjunction with other methods. Preferably, this process begins with a step 602 of determining an overall map or route. After the overall map or route has been selected, the map or route is preferably divided into two or more smaller portions. Any desired approach can be used to divide the map or route, and one suitable example is shown in FIG. 7.

A particular map portion is selected in step 604. After this map portion has been selected, the process determines which coordinate system, either absolute or relative, will encode or express the various map features associated with the map portion most efficiently. The selection of absolute or relative coordinates is discussed in greater detail below. If a relative coordinate system more efficiently encodes or expresses the information, then a relative coordinate system is used, and the various map features associated with the selected map portion are encoded in relative coordinates 608. On the other hand, if absolute coordinates are more efficient, than the various map features associated with the selected map portion are encoded using absolute coordinates 610.

After the selected map portion has been encoded, the process, in step 612, determines if the map is complete or if there are other map portions left to encode. If the map is incomplete, the process returns to step 604 where another map portion that has yet to be encoded is selected. If the process determines that the map is complete and that all of the map portions have been encoded, the process ends. In some embodiments, the map portions are assembled "on the fly," that is, during the encoding process. In other embodiments, the map portions are encoded and at the very end, all of the various map portions are assembled in step 614.

After the overall map has been determined in step 602, the process shown in FIG. 6, attempts to reduce the overall amount of information that needs to be transmitted. One way to accomplish this reduction in data is to use relative or absolute coordinates to define various objects on a map.

In an absolute coordinate system, each coordinate is expressed independently from other coordinates. The information associated with a particular coordinate is sufficient to define the coordinate on a map or region.

Preferably, an absolute coordinate includes two bytes of data. One byte is used for the value of one axis, and the other byte is used for the value of the other axis. For example, a single absolute coordinate can be expressed as (X1, Y1) where X1 is the x-axis value and Y1 is the y-axis value of the coordinate. Preferably, one byte is used to define X1 and a second byte is used to define Y1. Thus, if absolute coordinates are used, two bytes are used to define each coordinate. If a map were to include two coordinates, then four bytes would be used to the two coordinates. For example, the first coordinate would be (X1, Y1) and the second coordinate would be (X2, Y2). As noted above, two bytes would be used to define X1 and Y1. Two bytes would also be used to define the second coordinate; one byte for X2 and a second byte for Y2. Thus, in this simple example, a total of four bytes would be used to define two coordinates using the absolute coordinate system.

In contrast, relative coordinates preferably use an initial absolute coordinate, and one or more subsequent coordinates that are defined in relation to the initial coordinate. For example, consider a situation where two coordinates are defined using a relative coordinate system. The first coordinate (X3, Y3) would be defined using an absolute coordinate system and the second coordinate, (X4, Y4) would be defined relative to the first coordinate. In a preferred embodiment, the values associated with the second coordinate are expressed as differences or displacements from the first coordinate. In this embodiment, the X-axis value would be X4-X3 or dX and the Y-axis value would be Y4-Y3 or dY. In this example, the first coordinate would be (X3, Y3) and the second coordinate would be expressed as (dX, dY). Preferably, the expression (dX, dY) is encoded as a single byte.

In a preferred embodiment, a portion of the byte is used to express dX and another portion of the byte is used to express dY. In an exemplary embodiment, the byte is divided into two halves, and the first half is used to express dX while the second half is used to express dY. Any suitable byte length can be used. For example, in some cases, a byte comprises eight (8) bits. In this case, in an exemplary embodiment, the first four bits would be used to express dX and the next four bits would be used to express dY. In another example, a byte is comprised of 16 bits. Here, the first eight bits would be used to express dX and the next eight bits would be used to express dY. In other cases, bytes can include 32, 64, 128, 256, 512, 1024 or any other number of bits. Regardless of the size of the byte, the principles of encoding a two axis displacement into a single byte can be applied.

Returning to the simple example, two bytes are required when using an absolute coordinate system while only three bytes are required when using a relative coordinate system. Thus, in this simple example, the relative coordinate system more efficiently encodes the data. There are cases where an absolute coordinate system is advantageous. One example is a long, straight road. The road can be defined by its two end points. In absolute coordinates, the two end points would require four bytes. However, in relative coordinates, many intermediate points may be required. This is because of the limited bit length available for each displacement step. Because of this, a relative coordinate system may require many intermediate points to define the entire road. In sum, both systems have their advantages and disadvantages. There are cases where absolute coordinates more efficiently encode a particular item of navigation information and there are cases where relative coordinates more efficiently express an item of navigation information. Preferably, the more efficient system is selected, as disclosed below.

In some embodiments, the entire map is represented in absolute or relative coordinates. However, in other embodiments, portions of the map are selected and these individual portions are represented in either absolute or relative coordinates. FIG. 7 is schematic diagram of an example of a map 702 that has been divided into regions. As shown in FIG. 7, map 702 includes some regions where absolute coordinates have been used. These regions are symbolized on map 702 with the letter "A." Map 702 also includes regions where relative coordinates have been used. These regions are represented in map 702 with the letter "R."

Preferably, the coordinate system that requires the smallest amount of information to accurately represent the relevant data for that particular region is selected. Thus, if a relative coordinate system requires less information to define the desired map elements or a particular region, then a relative coordinate system is used. On the other hand, if an absolute coordinate system requires less information, then an absolute coordinate system is used.

In some embodiments, individual map features are represented in one coordinate system, while other similar map features are represented using the other coordinate system. A map feature is any item or entity that can appear on a map. Some examples of map features include streets or roads, landmarks, points of interest, parks, commercial areas, parking lots, and geographic features like mountain ranges and bodies of water. FIG. 8 is an example of distinct coordinate systems representing similar map features. Consider, for example, map portion 802, which includes a first road 804 and a second road 806. First road 804 generally extends west to east, while second road 806 generally extends north to south. First and second roads 804 and 806 meet at intersection 808.

In this example, it is assumed that 804 can be represented with less information using a relative coordinate system than if an absolute coordinate system were used. Because of this, a relative coordinate system is used to represent first road 804. In contrast, it is assumed that second road 806 can be represented in absolute coordinates more efficiently, that is, with less data, than with relative coordinates. Thus, absolute coordinates would be selected for second road 806. In this way, similar map features within a particular map region are represented using different coordinate systems.

In some embodiments, different portions of the same map feature can be represented in different coordinate systems. FIG. 9 is a schematic diagram of an example map region 902. Although any map feature can be represented with two different coordinate systems, FIG. 9 provides an example of a road 904 that is represented by two different coordinate systems. Road 904 includes a first portion 906 and a second portion 908. In the example shown in FIG. 9, first portion 906 is more efficiently represented using relative coordinates. That means that first portion 906 can be represented by less information if relative coordinates are used, than if absolute coordinates are used. In contrast, second portion 908 is more efficiently represented in absolute coordinates. Preferably, in order to most efficiently encode road 904, a relative coordinate system is used to represent first portion 906 and an absolute coordinate system is used to represent second portion 908.

In some embodiments, different axes of a single map feature are represented using different coordinate systems. One example of this is a situation where the X-axis of a particular map feature is more efficiently represented using absolute coordinates and the Y-axis of the same map feature is more efficiently represented using relative coordinates. In this case, the X-axis of the map feature can be represented in absolute coordinates while the Y-axis can be represented in relative coordinates.

Some embodiments include provisions to reduce the size of information transmitted from service provider 108 to OBU 500. Although the following procedure can be performed in any step shown in FIG. 5, it is preferred that the following procedure be performed in step 510.

The following procedure reduces the size of information by removing duplicate information. Referring to FIG. 10, which is an example of map with five roads labeled E, F, G, L M and N. Each of the roads are comprised of one or more segments. For example, road E is comprised of segments E1, E2, E3, E4, E5 and E6. Road F is comprised of segments F1, F2, F3, F4, F5, F6, F7, F8 and F9. The other roads are also comprised of various segments as shown in FIG. 10.

Given the map data of FIG. 10, consider an example where a route is plotted. FIG. 11 is a schematic diagram of FIG. 10 with route 1102. Route 1102 includes the following segments: N1, N2, N3, E3, L4, L5, L6 and L7.

In some embodiments, information regarding all of the segments of all of the roads associated with map 1002 is sent and then information related to the segments associated with route 1102. To demonstrate this, reference is made to Figures BC and BD. Figure BC is a schematic diagram of information related to map 1002. Each of the boxes in Figure BC contains a segment label, and those segment labels represent information used to define the segment. In some cases, each segment is defined by an initial XY coordinate and a final XY coordinate. In other cases, each segment is defined by an initial XY coordinate and a displacement.

Regardless of how each segment is defined, six segments related to road E, nine segments related to road F, five segments related to road G, seven segments related to road L, four segments related to road M and three segments related to road N for a total of thirty four (34) segments are established and prepared for transmission.

After information related to map 1002 has been prepared and/or sent, information related to route 1102 is prepared. As disclosed above and as shown in FIG. 11, example route 1102 includes segments N1, N2, N3, E3, L4, L5, L6 and L7, for a total of eight (8) segments. Information related to the segments associated with route 1102 is then prepared and/or sent. In this example, information related to a total of forty two (42) segments required to define map 1002 and route 1102 on map 1002. This is because thirty four (34) segments are required to define map 1002 and eight (8) segments are required to define route 1102. Adding thirty four (34) and eight (8) yields a total of forty two (42) segments. Schematically, this process can be understood by considering the segments contained in FIG. 12 being transmitted followed by the segments contained in FIG. 13. Notice that the segments used to define route 1102 are redundantly transmitted, first to define map 1002 and then to define route 1102.

It is possible to reduce the number of total segments required to define route 1102 in map 1002. FIG. 14 is a schematic diagram of a preferred embodiment of a method for preparing and/or sending map and route information. In this embodiment, route information is prepared and is established as the first set of information. Map information other than the route information is placed after the route information.

Returning to the examples shown in FIGS. 10 and 11, recall that information associated with route 1102 is expressed as segments: N1, N2, N3, E3, L4, L5, L6 and L7, as shown in FIG. 13. Preferably, this route information is placed or transmitted first. As shown in FIG. 14, which is a schematic diagram of a preferred embodiment of information related to map 1002 and route 1102, information related to route 1102 is placed before other information. Other non-route information is placed after route 1102 information. In some embodiments, a separation character is placed between route 1102 information and other non-route information. In other embodiments, a header is provided before any information is sent. This header can include information regarding the end of route 1102 information and the beginning of other non-route information. In some cases, the header can include the number of segments of route 1102 information. In other cases, the header can include a name, label or other indicia of the last segment of route information.

This results in a total of thirty four (34) segments. Using this technique, the redundancy of expressing and transmitting route information is eliminated, and only 34 segments are required to express map 1002 and route 1102 as opposed to forty two (42) segments.

Figure 16:
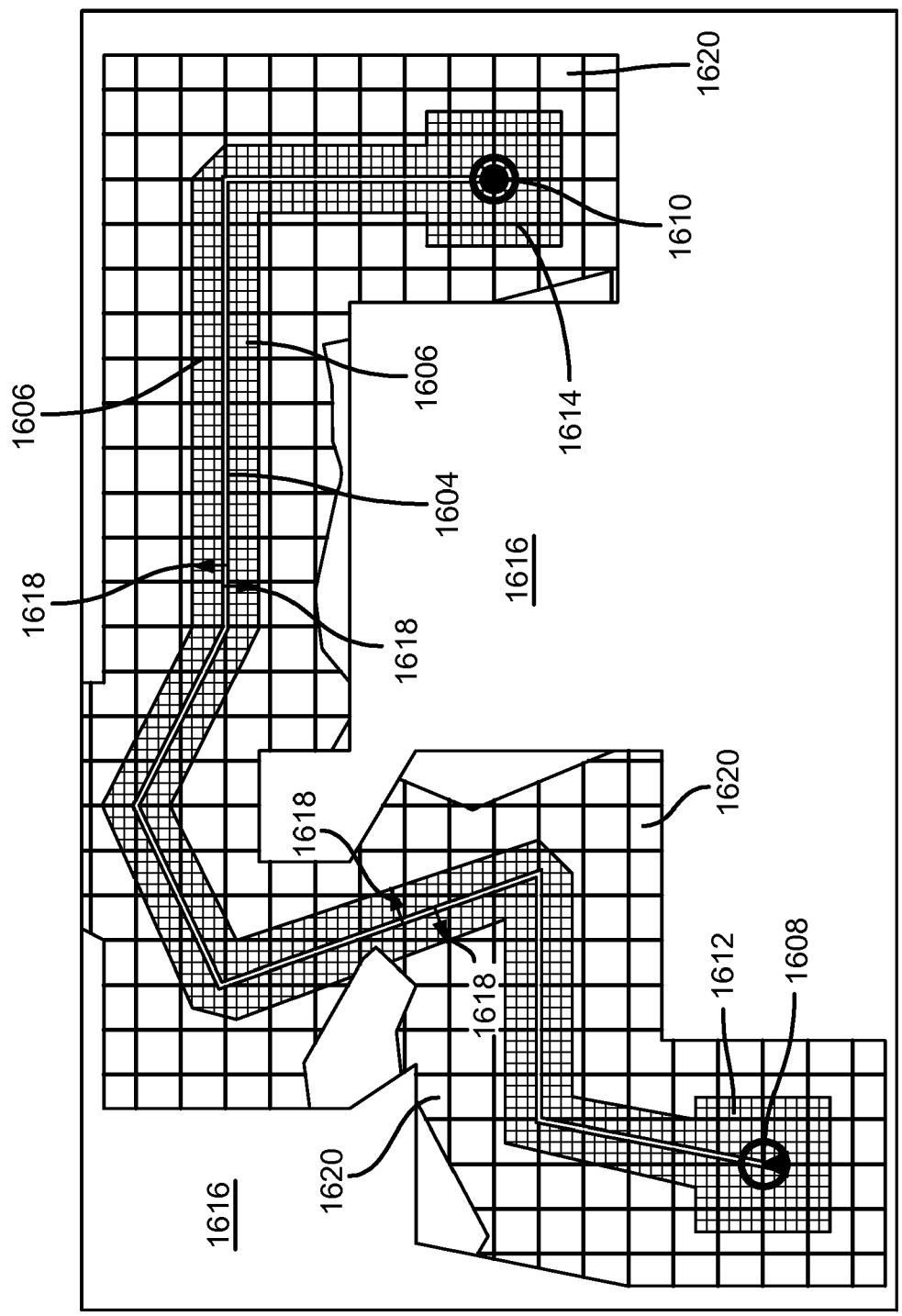
FIG. 16 is a schematic diagram of a preferred embodiment of a map.

In some embodiments, different portions of a map or route are defined using different levels of detail. In some cases, certain regions are defined in greater detail than other regions. Referring to FIG. 16, which is a preferred embodiment of an example map 1602, a route 1604 has been determined. In some embodiments, there are two regions with different levels of detail, in other embodiments, there are three or more regions that have different levels of detail. In the embodiment shown in FIG. 16, there are three regions with different levels of detail.

A first region 1606 proximate route 1604 is encoded or established with a first level of detail. Preferably, this first level of detail accurately portrays many map features, for example, small side streets and roads, detailed information regarding intersections, points of interest, information regarding businesses and other detailed information. In some embodiments, this first level of detail includes full detail or all available information.

First region 1606 can extend a predetermined distance from route 1604. In some cases, first region 1606 extends further away from route 1604 in some places than in other places. Preferably, first region 1606 extends further away from route 1604 at its endpoints than at other portions of route 1604.

Referring to the example in FIG. 16, route 1604 includes a starting point 1608 and an destination point 1610. Starting point 1608 is preferably used to represent the starting point of route 1604, and includes a starting point first region 1612 disposed about starting point 1608. In some cases, like the embodiment shown in FIG. 16, starting point first region 1612 surrounds starting point 1608. In other embodiments, starting point first region 1612 does not completely surround starting point 1608.

Similarly, destination point 1610 is used to represent the destination point of route 1604. Preferably, destination point 1610 includes a destination point first region 1614 disposed about destination point 1610. In some cases, like the embodiment shown in FIG. 16, destination point first region 1614 surrounds destination point 1610. In other embodiments, destination point first region 1614 does not completely surround destination point 1610.

Starting point 1608 and destination point 1610 can be referred to as end points. End points are disposed at outer ends of a given route. Preferably, the size of first region 1606 is different near the end points than for other points along route 1604. End point first regions can also have different shapes than the shape of first region 1606 along route 1604.

Figure 17:
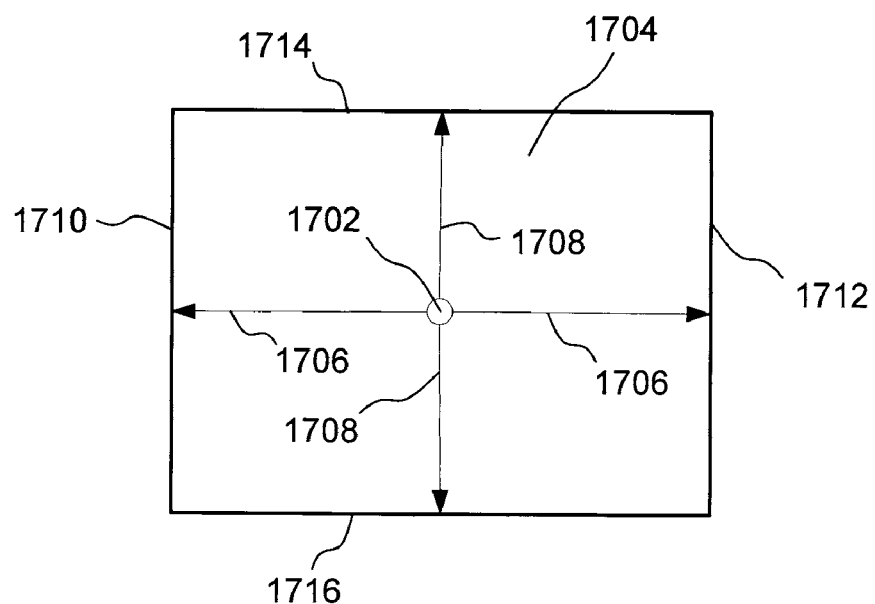
FIG. 17 is a schematic diagram of a preferred embodiment of an end point first region.
Figure 18:
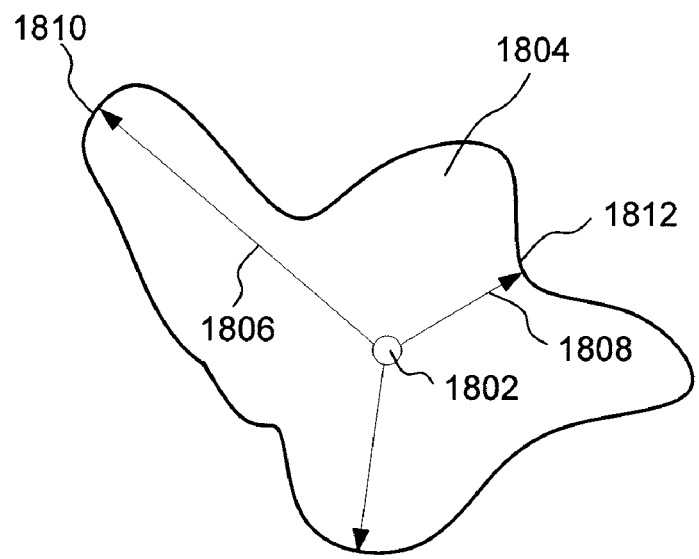
FIG. 18 is a schematic diagram of a generalized embodiment of an end point first region.

FIGS. 17 and 18 are schematic diagrams of embodiments of end point first regions. The embodiments of end points shown in FIGS. 17 and 18 can be applied to ether starting point 1608 or destination point 1610 or both. An end point 1702 can be seen in FIG. 17, along with a preferred embodiment of an destination point first region 1704 associated with end point 1702. Although any arbitrary shape can be selected and used as end point first region 1702, the box shape shown in FIG. 17 is preferred.

As shown in FIG. 17, end point first region 1704 includes a boundary comprising first side 1710, second side 1712, third side 1714 and forth side 1716. Although the sides can assume any desired orientation, preferably, first and second sides 1710 and 1712, respectively, are preferably disposed on either side of end point 1702 and third and fourth sides 1714 and 1716, respectively, are disposed above and below end point 1702. In some embodiments, first side 1710 and second side 1712 are vertical, in other embodiments, they are angled, curved or irregular. In some embodiments, third side 1714 and fourth side 1716 are horizontal, in other embodiments, they are angled, curved or irregular.

In the embodiment shown in FIG. 17, First side 1710 is spaced from end point 1702 a distance of about 1706 and second side is also spaced a distance of about 1706 from end point 1702. Third side 1714 is spaced from end point 1702 a distance of about 1708 and fourth side 1716 is spaced from end point 1702 a distance of about 1708. This provides an end point first region 1704 having dimensions 2\*1706×2\*1708, where 1706 and 1708 are not literal distance dimensions or lengths, but rather represent the respective distances between a side and end point 1702. In some embodiments, end point 1702 is roughly centered within end point first region 1704, in other embodiments, end point 1702 is disposed at a location that is not centered about end point first region 1704. Referring to FIGS. 16 and 17, the principles and characteristics of end point first region 1704 can be applied to either starting point first region DA12 or destination point first region 1614 or both.

FIG. 18 shows another embodiment of an end point first region 1804 and its associated end point 1802. In this embodiment, end point first region 1804 has a generalized shape. Different portions of end point first region 1804 are spaced different distances from end point 1802 than other portions. For example, first portion 1810 is spaced from end point 1802 by a distance of about 1806 and second portion 1812 is spaced from end point 1802 by a distance of about 1808.

Referring to FIGS. 16 and 18, the principles and characteristics of end point first region 1804 can be applied to either starting point first region 1612 or destination point first region 1614 or both.

Referring to FIGS. 16 to 18, a comparison can be made between the extent or relative size of the first region 1606 associated with route 1604 and the first region associated with an end point. In a preferred embodiment, the relative size of a portion of the first region associated with an end point is larger than the size of a first region associated with route 1604. In some cases, a portion of the first region associated with an end point is larger than the first region associated with a route, while other portions of the first region associated with an end point are smaller than the first region associated with a route. In other cases, the size of the first region associated with an end point is larger in every direction than the size of the first region associated with a route. These features can be observed with reference to the Figures.

Referring to FIGS. 16 to 18, the relative sizes of first region 1606 associated with route 1604, starting point first region 1612 and destination point first region 1614 are considered. First region 1606 generally extends in a distance normal or perpendicular to route 1604. As route 1604 bends and turns, first region 1606 follows this meandering path and the outer boundaries of first region 1606 generally remain parallel to route 1604 on either side. As shown in FIG. 16, the boundaries of first region 1606 can be truncated, cut, or otherwise modified around turns. These modifications can be made to facilitate rapid computation of the size and boundary of first region 1606, or these modifications can be made when an approximation, as opposed to an exact distance, is desired. Given these variations, portions of first region 1606 extend a distance 1618 away from route 1604. It is possible for some portions of first region 1606 to extend further away from route 1604 than distance 1618, and it is also possible for some other portions of first region 1606 to remain closer to route 1604 than distance 1618. This is particularly true at bends or curves, but these variations can also occur on straight portions of route 1604 as well.

Distance 1618, which is the perpendicular distance from route 1604 to an outer boundary of first route 1606 along a portion of first route 1606, can be used to determine the relative general width of a portion of first region 1606. Preferably, first region 1606 extends in roughly equal distances on one side of route 1604 as on the other side. Although these distances can vary, equal distances are generally preferred. Given this arrangement, the width of first region 1606 is approximately twice distance 1618 or 2\*(1618), where 1618 is not a literal number or length measurement, but a representation of the distance from route 1604 to the outer boundary of first region 1606, as shown in FIG. 16.

The width of first region 1606 can be compared with the size of a first region associated with an end point. In some embodiments, starting point first region 1612 has the characteristics of end point first region 1704 as shown in FIG. 17. In this example, end point first region 1704 includes first and second sides 1710 and 1712. These sides are spaced a distance 1706 from end point 1702. In some embodiments, the distance 1706 from end point 1702 to first side 1710 is greater than the distance 1618 between route 1604 and an outer boundary of first region 1606.

End point first region 1704 also includes third and fourth sides 1714 and 1716, respectively. The distance between these sides and end point 1703 is 1708. In some embodiments, the distance 1708 from end point 1702 to third side 1714 is greater than the distance 1618 between route 1604 and an outer boundary of first region 1606.

When distance 1706 and 1708 are both considered and compared with distance 1618, other embodiments can be observed. In some embodiments, distance 1706 is roughly equal to distance 1708. This provides a generally square shaped end point first region 1704. In other embodiments, the distance 1706 is not equal to distance 1708, resulting in a rectangular end point first region 1704. In some embodiments, both distances 1706 and 1708 are greater than distance 1618. In other embodiments, one of the distances 1706 or 1708 is greater than distance 1618, while the other distance is less than distance 1618. In some alternative embodiments, distance 1618 is greater than either distance 1706 or 1708. In a preferred embodiment, both distances 1706 and 1708 are greater than distance 1618.

FIG. 18 shows another embodiment of an end point 1802 and its associated end point first region 1804, as disclosed above. Recall that end point first region 1802 includes a first portion 1810 that is spaced a distance 1806 from end point 1802 and a second portion 1812 that is spaced a distance 1808 from end point 1802.

These distances 1810 and 1812, can be compared with distance 1618. In some embodiments, both distances 1810 and 1812 are greater than distance 1618. In other embodiments, one of the distances 1810 or 1812 is greater than distance 1618, while the other distance is less than distance 1618. In some alternative embodiments, distance 1618 is greater than either distance 1810 or 1812.

In addition to a first region, some embodiments also include a second region 1620. Preferably, second region 1620 includes less detail than first region 1606. In some embodiments, this means that at least one item or class of navigation information is omitted from second region 1620 as compared to first region 1606. For example, small side streets, one class or type of navigation information, may be omitted in second region 1620 but may be represented in first region 1606. Business names could be another example. First region 1606 may represent or include certain business names, while second region 1620 omits these items of navigation information. In a preferred embodiment, second region 1620 includes major arteries, like interstate highways, major geographic features, like major bodies of water, and other major or significant features like bridges, national parks, airports, and major political subdivisions, like state lines and city limits.

In addition to first region 1606 and second region 1620, some embodiments include a third region 1616. Preferably, third region 1616 includes all areas or portions of map 1602 that is not defined by any other portion. In the embodiment shown in FIG. 16, third region 1616 includes portions of map 1602 that is not described or defined by first region 1606 or second region 1620. Preferably, third region 1616 includes less detail than second region 1620. Again, items or classes of navigation information can be omitted in third region 1616 that is described in second region 1620. In a preferred embodiment, third region 1616 includes no navigation information.

This process formats and prepares navigation information for efficient transmission. Information far from a desired route is simplified or eliminated and information near the desired route is provided in greater detail. Essential and useful information near the route is retained, while information far from the route is simplified or condensed. In this way, essential and useful information is made available, while information that is not likely to be used is discarded or simplified.

Navigation information can also be transmitted in a way to improve the availability of the navigation information and to provide useful information more quickly to a user. In one embodiment, this is accomplished by sending the navigation information in a particular order.

FIGS. 19 to 22 are flow diagrams of various different embodiments showing different ways to transmit navigation information to an OBU. Referring to FIGS. 5, 16 and 19 to 22, there are preferably four discreet sets of data that are sent from service provider 108 to OBU 500. These four sets of data include: "Entire Route Map," "Detail of Starting Point," "Detail of Destination Point," and "Detail Along Route."

In a preferred embodiment, "Entire Route Map," refers to information related to route 1604. This information can be used to define route 1604. "Detail of Starting Point" refers to information related to starting point first region 1612. This information provides details of the area near starting point 1608. Similarly, "Detail of Destination Point" provides information related to destination point first region 1614. This information provides details of the area near destination point 1610. "Detail Along Route" provides information related to first region 1606 associated with route 1604. Preferably, these four discreet items of data are sent in a predetermined order.

Figure 19:
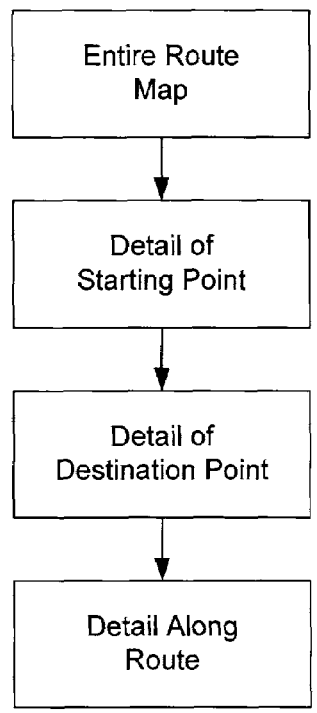
FIG. 19 is a flow diagram of a preferred embodiment of a prioritized order of transmission of navigation information.

In the embodiment shown in FIG. 19, Entire Route Map is transmitted first, then Detail of Starting Point, then Detail of Destination Point and finally, Detail Along Route. In this embodiment, the intent is to allow the user to commence the journey as soon as possible. Thus, the Entire Route Map, which would include directions along the route, is transmitted first. In some cases, this allows the user to begin driving without having to wait until all of the information is sent to the OBU.

Figure 20:
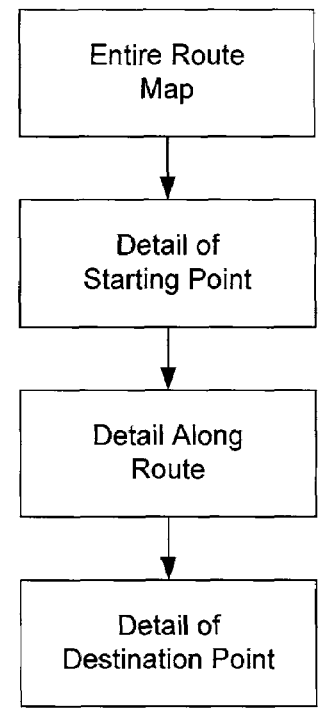
FIG. 20 is a flow diagram of an alternative embodiment of a prioritized order of transmission of navigation information.

In the embodiment shown in FIG. 20, Entire Route Map is transmitted first, then Detail of Starting Point, then Detail Along Route, and finally, Detail of Destination Point. This embodiment is similar to the embodiment shown in FIG. 19 except the last two steps are reversed. This embodiment can be used when the user is familiar with the destination point and it would be more helpful to the user to receive details along the route before details of the destination are received.

Figure 21:
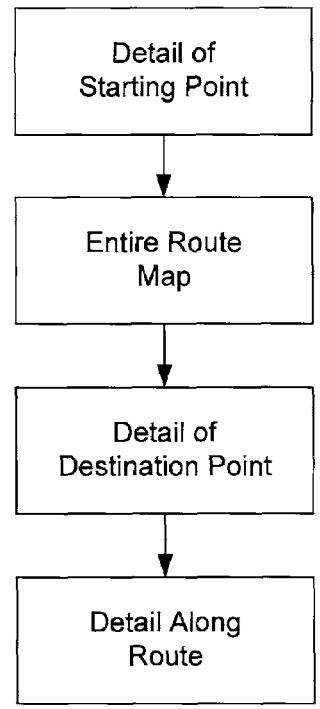
FIG. 21 is a flow diagram of an alternative embodiment of a prioritized order of transmission of navigation information.

In the embodiment shown in FIG. 21, Detail of Starting Point, is transmitted first, then Entire Route Map, then Detail of Destination Point and finally, Detail Along Route. This embodiment can be used when the user is unfamiliar with the current surroundings and the current starting point. Details of the starting point may be helpful in assisting the user in finding the route. In this case, details of the starting point would be the most helpful information and would help the user to commence the journey as soon as possible.

Figure 22:
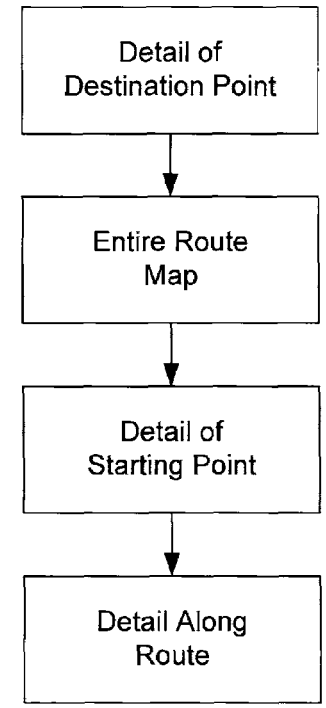
FIG. 22 is a flow diagram of an alternative embodiment of a prioritized order of transmission of navigation information.

In the embodiment shown in FIG. 22, Detail of Destination Point, is transmitted first, then Entire Route Map, then Detail of Starting Point and finally, Detail Along Route. This embodiment can be used when the user is unfamiliar with the destination point and wants to confirm that the navigation information is correct and is likely to provide correct driving directions. In these instances, details of the destination would be the most helpful information for the user to receive first.

The above embodiments are exemplary. Clearly other embodiments are also possible, and the order of delivery can be adjusted or selected to suit a particular need or situation. Referring to FIGS. 19 to 22 and 5, preferably, the various embodiments showing different transmission sequences for the four types of data occur in step 512 where navigation information is sent from service provider 108 to OBU 500.

In some embodiments, navigation information can be modified. In some cases, these modifications reduce the amount of data that is sent from service provider 108 (see FIG. 1). In the embodiments shown FIGS. 23-27, selected map information is modified so that certain map elements are combined or eliminated prior to being sent by service provider 108. Preferably, this is done where the combination or elimination of those map elements does not affect the usefulness of the overall map.

One example would be a situation where there are separate inbound and outbound lanes of a divided highway. The native or original navigation information defines both the inbound lanes and the outbound lanes as separate and distinct roads. In other words, if all of the native or original information could be observed, the inbound lanes would be seen as one road and the outbound lanes would be seen as a separate road.

Consider a situation where a user requests a very large scale map that includes the divided highway. Upon examination, it is discovered that the map is at a scale where the inbound and outbound lanes of the highway would not be distinguishable when displayed on the user's display. This can occur when the differences between the coordinates defining inbound and outbound lanes are smaller than the resolution of the user's display. In this situation, the display would not be able to display two separate roads, instead, the display would only be capable of displaying a single road and still maintain the proportionate size of the road with respect to other map elements. Even if the coordinates for the inbound and outbound lanes were sent, the user's display could not display those lanes separately due to the display's resolution limitations.

In these kinds of cases, service provider 108 (see FIG. 1) preferably makes a modification to the data. In some instances, service provider 108 combines the inbound and outbound lanes into one map element or eliminates either one of the lanes. This can reduce the amount of data that is sent by service provider 108 and improve the delivery of navigation information. Like other steps or processes, this process is optional and is not mandatory.

Figure 23:
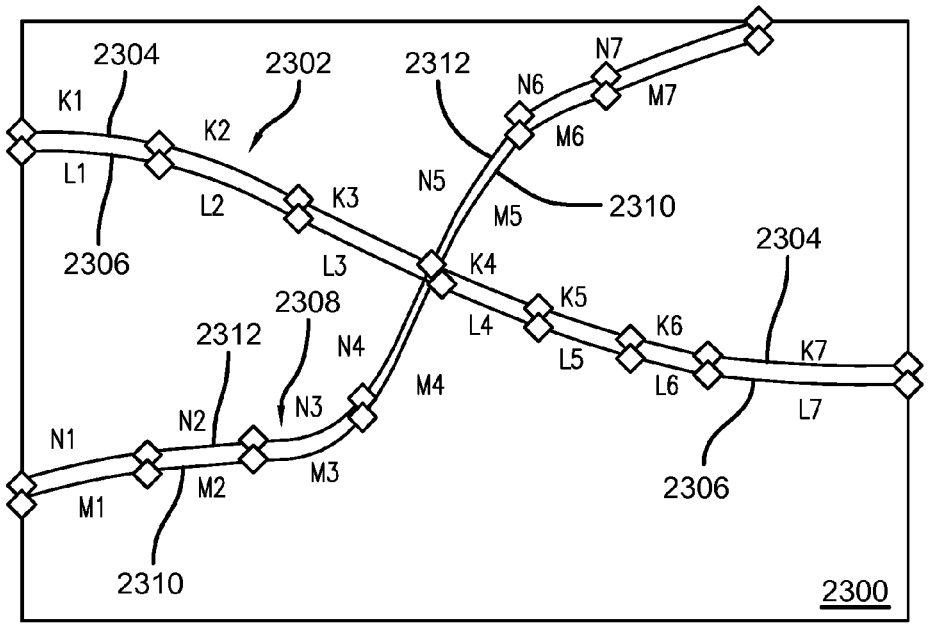
FIG. 23 is a schematic diagram of a preferred embodiment of a map.

FIG. 23 is a schematic diagram of two map features. First map feature 2302 is comprised of two map elements, a first map element 2304 and a second map element 2306. First map element 2304 is comprised of coordinates K1, K2, K3, K4, K5, K6 and K7. Second map element 2306 is comprised of coordinates L1-L7. Second map feature 2308 is comprised of two map elements, third element 2310 and fourth element 2312. Third element 2310 is comprised of coordinates M1-M7 and fourth element 2312 is comprised of coordinates N1-N7. FIG. 23 is shown in a resolution and scale where all of the map elements are separately visible.

In some cases, map information is sent to a device that is incapable of adequately displaying the various map elements in such a way that the map elements are separately visible. This can occur where the device does not have a resolution and/or size capable of accommodating and rendering the various map elements separately. The scale of the map can also affect the ability of a display to render the various map elements separately.

In those instances where a display would be unable to render map elements separately, sending information defining those map elements would be redundant. Thus, a process is preferably employed to optimize the data that is sent.

Figure 26:
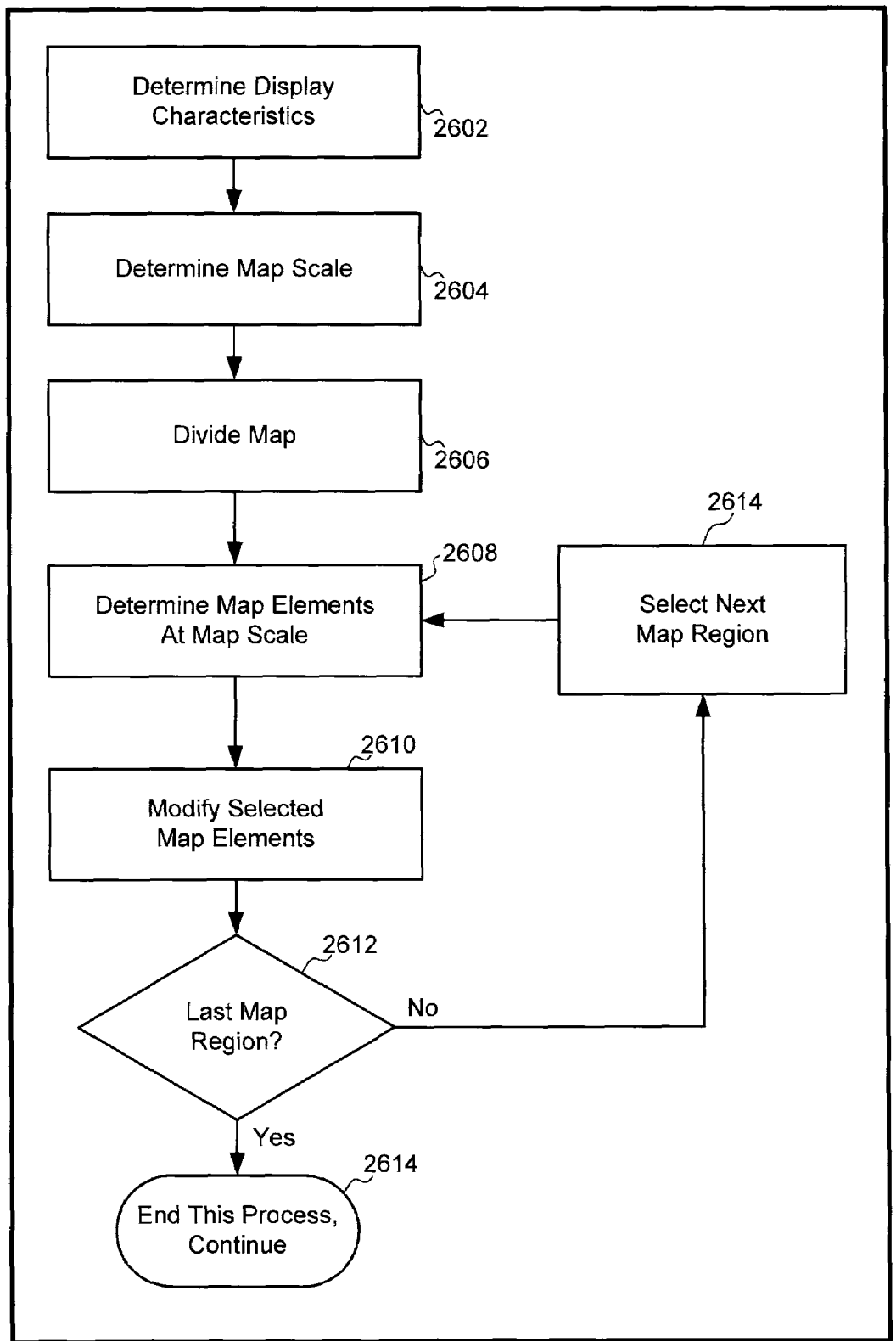
FIG. 26 is a flow diagram of a preferred embodiment of a process for modifying navigation information.
Figure 27:
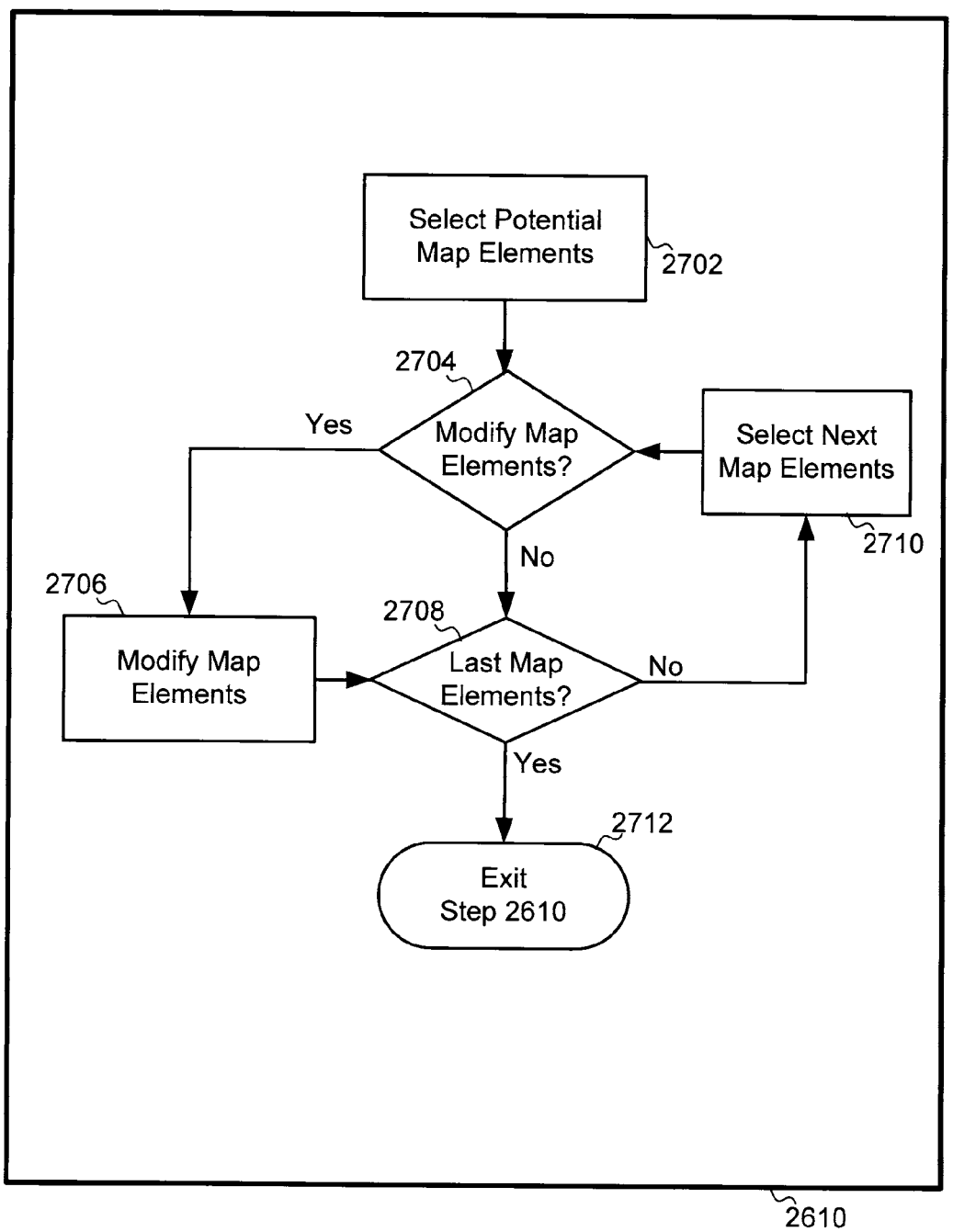
FIG. 27 is a flow diagram of a preferred embodiment of a process for modifying map elements.

One of the goals of this process is to modify map 2300 so that the modification does not adversely affect the information associated with map 2300. FIGS. 26 and 27 show a preferred embodiment of a process or method for modifying information.

Preferably, this process is performed by service provider 108. As shown in FIG. 15, this process of modifying map elements 1508 is one of many different processes that can be utilized. And like the other processes, this process is optional. This process can also be used with one or more of the processes shown in FIG. 15. FIG. 26 is an enlarged view of the process for modifying map elements 1508.

Referring to FIGS. 1, 3, 5 and 26, the process begins by determining the display characteristics associated with display 326 associated with OBU 500 that has requested navigation information from service provider 108 in step 2602. Recall that OBU 500 can include one or more of the elements shown in FIG. 3. In this embodiment, OBU 500 preferably includes display 326. Display characteristics generally refer to the qualities or traits of a display. Some examples of display characteristics include one or more of the following: screen size, screen resolution, number of available colors and aspect ratio. In some embodiments, these display characteristics are retrieved and in other embodiments, a user inputs the display characteristics. In those embodiments where the display characteristics are retrieved, a database can be used to store information related to the display characteristics that are associated with a particular OBU. Also, OBU 500 can send its associated display characteristics to service provider 108.

After the display characteristics have been obtained, the scale of a map is determined in step 2604. The scale of the map can change depending on the circumstances. In some embodiments, an overall route is displayed and in other embodiments, a fixed scale map is scrolled in various directions as the user progresses towards a destination.

In step 2606, the map can be divided. This is an optional step and need not be performed. In the embodiment shown in FIGS. 23-25, map 2300 is not divided. If the map is divided, then it can be divided in any desired manner.

In step 2608, the process determines or defines map elements at a particular map scale. Using an analogy to graphics, this is similar to rendering a particular shape at a given scale. However, it should be kept in mind that, in most cases, service provider 108 does not actually produce a graphical or visual representation of map 2300, but rather produces information related to map 2300 that can be used to eventually graphically represent map 2300. In step 2608, the map features and map elements associated with map 2300 are defined at the map scale determined in step 2604.

In step 2610, selected map elements are modified. FIG. 27 is an enlarged view of step 2610 and is a flow diagram of a preferred embodiment of a process for modifying selected map elements. In step 2702, potential map elements are selected. Preferably a pair of map elements is selected. Any suitable pattern or method can be employed. For example, map elements from top to bottom can be selected, map elements from one side to the other side can be selected, or map elements from one corner to an opposite corner can be selected. Regardless of the particular method for selecting map elements, a preferred method would eventually compare each map element with every other map element.

For example, in a generally top to bottom selection system, fourth map element 2312 and third map element 2310 would be selected as the first pair. The second selected pair would be fourth map element 2312 and first map element 2304. The third selected pair would be fourth map element 2312 and second map element 2306. The fourth selected pair would be third map element 2310 and first map element 2304. The fifth selected pair would be third map element 2310 and second map element 2306. The sixth selected pair would be first map element 2304 and second map element 2306. In this way, each map element is eventually paired with every other map element.

After a pair of map elements have been selected, the process then determines if the selected pair of map elements should be modified in some way. This decision occurs in step 2704. In this step, the process determines if it would be advantageous to modify a selected pair of map elements.

The process considers one or more of the following factors to determine if a modification is desired. One of the factors is legibility. The process considers whether, given the map scale and the expression or definition of the map elements at that scale, the map elements would be legible as separate graphical entities when displayed by display 326 (see FIG. 3). In one embodiment, if the map elements in question would not be separately legible when rendered by display 326, this would weigh in favor of a modification. Conversely, if the map elements would be separately legible when rendered by display 326, then this factor would weigh against a modification.

Another factor that is considered is the extent of adjacency. There can be cases where two map elements are adjacent to one another in one portion, but then diverge and are not adjacent to one another in another portion. In one embodiment, the greater the extent of adjacency of a given pair of map elements, the more this factor weighs in favor of a modification. Conversely, the less two map elements are adjacent, the more likely those two map elements would be excluded from modification. In a preferred embodiment, only those map elements that are adjacent for their entire displayed extent are modified. In other words, in a preferred embodiment, the process only modifies those map elements that are adjacent to one another throughout their entire displayed distance. It is possible for a pair of map elements to qualify for modification in one map but not qualify for modification in a different map showing a different portion of the two map elements.

Preferably, both factors legibility and the extent of adjacency are considered when making the determination that a selected pair of map elements is modified. The following examples demonstrate a preferred decision making process. Consider a first selected pair of map elements, fourth map element 2312 and third map element 2310. The first factor is legibility. The process would determine if these two map elements would be separately legible when rendered at a desired scale on display 326. In this example, because the two map elements are so close, the process determines that forth map element 2312 and third map element 2310 would not be separately legible when rendered at a desired scale on display 326. So, this first factor weights in favor of a modification.

The second factor is the extent of adjacency. The process considers the extent to which the two selected map elements are adjacent to one another when rendered on display 326. In this example, fourth map element 2312 and third map element 2310 are adjacent to one another throughout their entire displayed extent. This factor would also weigh in favor of a modification.

One or both of the factors can be used to determine if two map elements should be modified. Additionally, the two factors can be accorded different weight, where one factor counts more than the other factor. In a preferred embodiment, both factors are considered in making the determination. After both factors are considered, the process determines that fourth map element 2312 and third map element 2310 should be modified. Because these two map elements are to be modified, the process moves to step 2706.

In step 2706, pairs of map elements that have been selected for modification in step 2704 are modified. Map information is preferably modified in such a way that the total amount of information sent by service provider 108 is reduced, while, at the same time, the usefulness of the information is not diminished by the reduction or compression of information. In one embodiment, selected map elements are eliminated and in another embodiment, map elements are combined.

Figure 24:
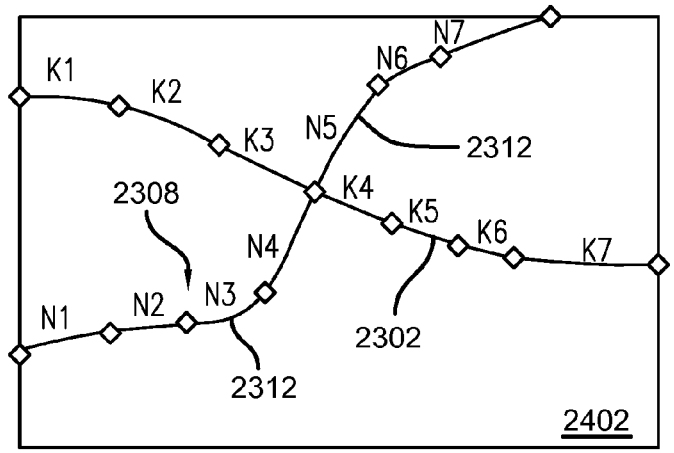
FIG. 24 is a schematic diagram of a preferred embodiment of a map including modified map information.
Figure 25:
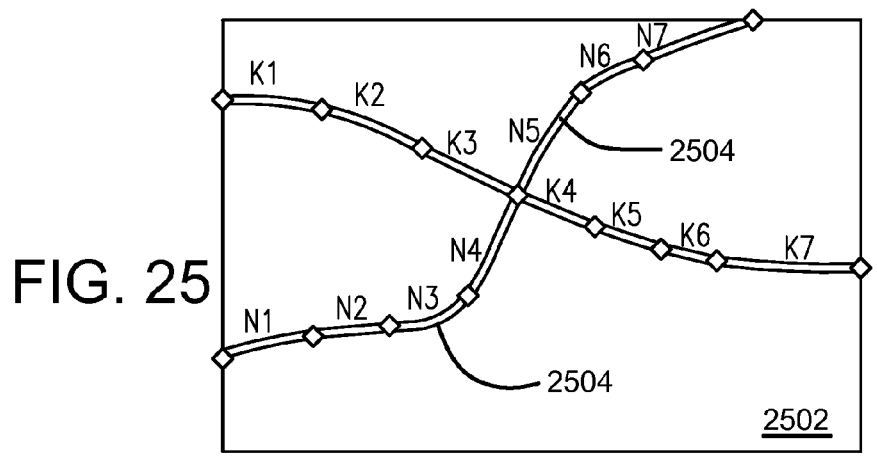
FIG. 25 is a schematic diagram of a preferred embodiment of a map including modified map information.

FIGS. 24 and 25 are schematic diagrams of preferred embodiments of maps that include modified map information. In the embodiment shown in FIG. 24, map elements have been eliminated. Recall that fourth map element 2312 and third map element 2310 have previously been selected for modification. In the embodiment shown in FIG. 24, one of the map elements, namely third map element 2310, has been eliminated and second map feature 2308 is represented only by fourth map element 2312.

FIG. 25 is a schematic diagram of another preferred embodiment of a map with modified map information. In this embodiment, map elements have been combined. Third map element 2310 and fourth map element 2312 have been combined to form second combined map feature 2504. Second combined map feature 2504 can be formed using the coordinates associated with both third map element 2310 and fourth map element 2312. In some cases, this combination of map elements and coordinates will result in a wider or thicker graphical representation of second combined map feature 2504, as shown in FIG. 25.

Returning to FIG. 27, after the modification has been made in step 2706, the process moves on to step 2708. In this step, the process determines if there are any additional pairs of map elements that need to be compared. If there are map element pairs remaining, then the process moves on to step 2710, where the next pair of map elements is selected. If there are no additional map elements left to compare, then processing associated with step 2610 is completed and step 2610 is exited in step 2712.

In this example, because there are many other pairs of map elements remaining, the next pair of map elements is selected in step 2710. Because fourth map element 2312 and third map element 2310 have already been selected, the fourth map element 2312 is then paired with first map element 2304. The process moves to step 2704 where the process determines if the map elements should be modified.

Preferably, as disclosed above, the two factors, legibility and the extent of adjacency are considered. Applying the first factor, legibility, the process would determine if fourth map element 2312 and first map element 2304 would be separately legible given a particular set of conditions. Those conditions would be things like display characteristics and scale of map, as disclosed above. In this case, fourth map element 2312 and first map element 2304 would be separately legible. This can be seen in FIG. 24. Although FIG. 24 is a schematic diagram of a preferred embodiment of map 2402 that includes modified information, map 2402 also shows, schematically, a map having an example of reduced size and resolution. In FIG. 24, a representation of first map feature 2302 and a representation of second map feature 2308 are separately visible. Because fourth map element 2312 is a part of second map feature 2308 and because first map element 2304 is a part of first map feature 2302, it can be assumed that fourth map element 2312 and first map element 2304 would be separately visible. Thus, the first factor, legibility, would weigh against a modification.

The second factor, the extent of adjacency is also considered in a preferred embodiment. Fourth map element 2312 and first map element 2304 meet at an intersection. This intersection is between segments K3 and K4 of first map element 2304 and segments N4 and N5 of fourth map element 2312. This intersection represents the only instance where first map element 2304 and fourth map element 2312 are adjacent to one another. For every other portion, the two map elements are not adjacent to one another. The process will recognize that the two map elements are only adjacent to one another for a relatively small portion of their overall length. Because of the relative lack of adjacently, and because the two map elements are not adjacent to one another for their entire length, this factor would weigh against a modification.

In this example, both factors weigh against a modification in decision step 2704, and no modification would be made. From this step, the process would proceed to step 2708 and determine if this is the last pair of map elements that needs to be compared or analyzed. Since there are still other remaining pairs of map elements that need to be considered, the process would move to step 2710, where the next pair of map elements would be selected. This process would continue until all of the remaining pairs of map elements have been considered for modification.

After all of the pairs of map elements have been considered, the process moves to step 2712, where step 2610 is exited and the process returns to step 2612 in FIG. 26. In step 2612, the process determines whether the last map region has been analyzed. Recall that step 2612 is associated with the optional divide map step 2606. If the option to divide the map is not used, then the process would end in step 2614 after the step of modifying selected map elements 2610 has been completed. In those cases where the map has been divided, and there are additional remaining map regions, the process would move to step 2614, where the next map region is selected. From there, the process would move to step 2608 after the next map region has been selected. This process would continue until all of the map regions have been analyzed.

It is important to note that the term "map," used here and throughout this disclosure, does not necessarily mean an actual, drawn or rendered map. The term "map" also refers to information associated with a particular map. In many embodiments, service provider does not actually draw or render a map prior to sending information related to the map to OBU 500 (see FIG. 5). Service provider 108 assembles the necessary information and sends this information to OBU 500.

In some embodiments, a service provider can vary the amount of information sent to an OBU. The amount of information sent can be varied in different ways. In some cases, the type or forms of content that is sent can be varied. In other cases, the level of detail can be varied.

This can be done for different reasons. In some cases, a user has selected a certain quantity or quality of information. In other cases, a service provider varies the amount of information sent to accommodate limitations in bandwidth or the ability of a network to reliably deliver information to an OBU.

Another feature varies the level of detail of navigation information based on location and proximity to a route. That feature is disclosed in connection with FIGS. 16-18 and the accompanying description. In contrast to that feature, this feature is related to an overall level of detail that is applied to an entire class or form of information.

Referring to FIGS. 1, 5 and 15, this information varying process is preferably conducted by service provider 108 in step 510. This process 1510, where service provider 108 varies the information sent, is shown in FIG. 15. Like the other processes shown in FIG. 15, this process is optional and need not be used in all embodiments. Furthermore, like the other processes shown in FIG. 15, the order in which this process is performed in relation to the other processes can be changed to suit particular needs or to enhance efficiency.

Figure 28:
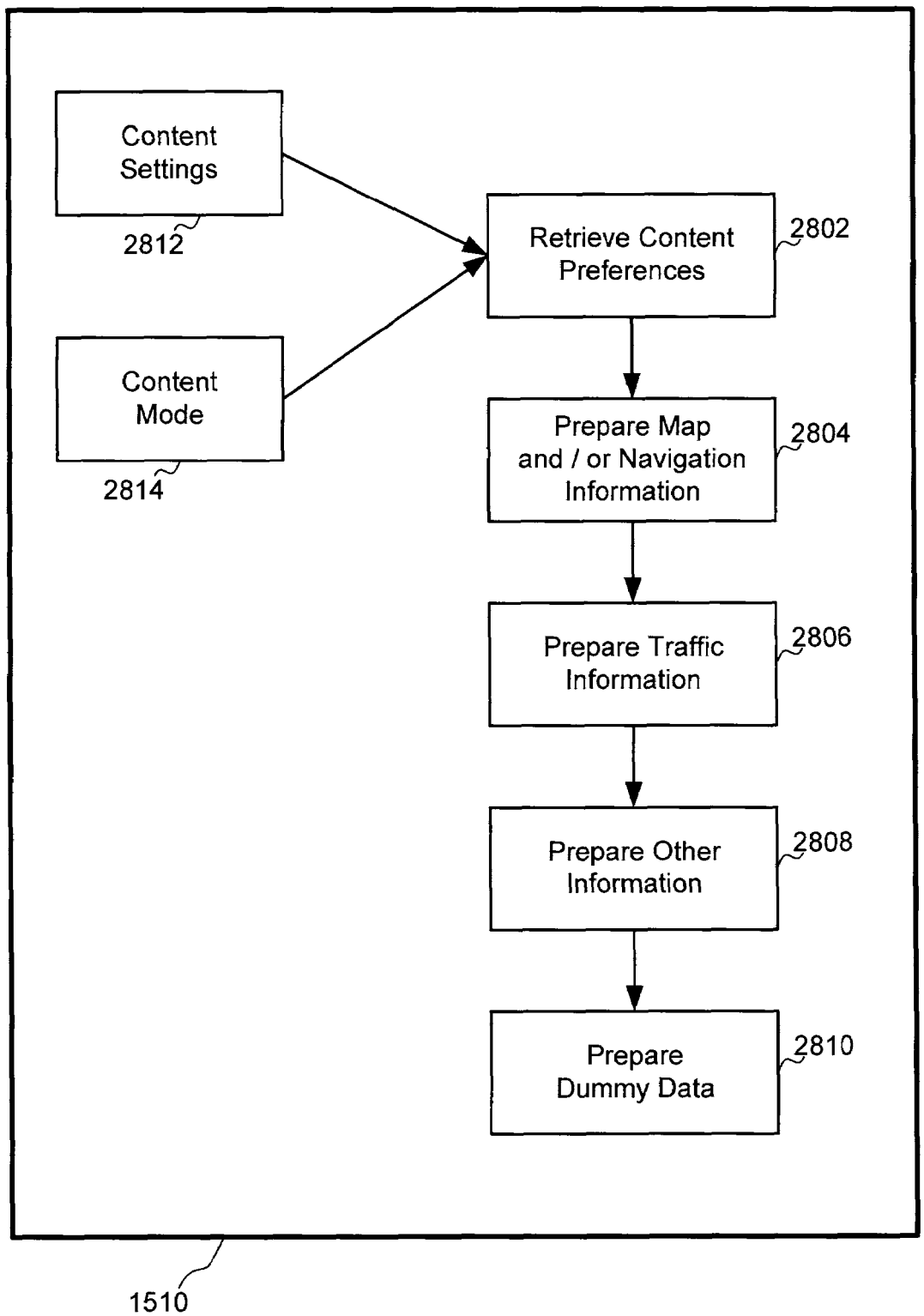
FIG. 28 is a flow diagram of a preferred embodiment of a process for varying navigation information details and/or content.

FIG. 28 is a flow diagram of a preferred embodiment of process 1510 for varying the amount of information sent by service provider 108. This process begins by receiving content preferences in step 2802. Preferably, both content mode information 2814 and content settings 2812 are received. However, in some embodiments, only one of these is received.

Figure 29:
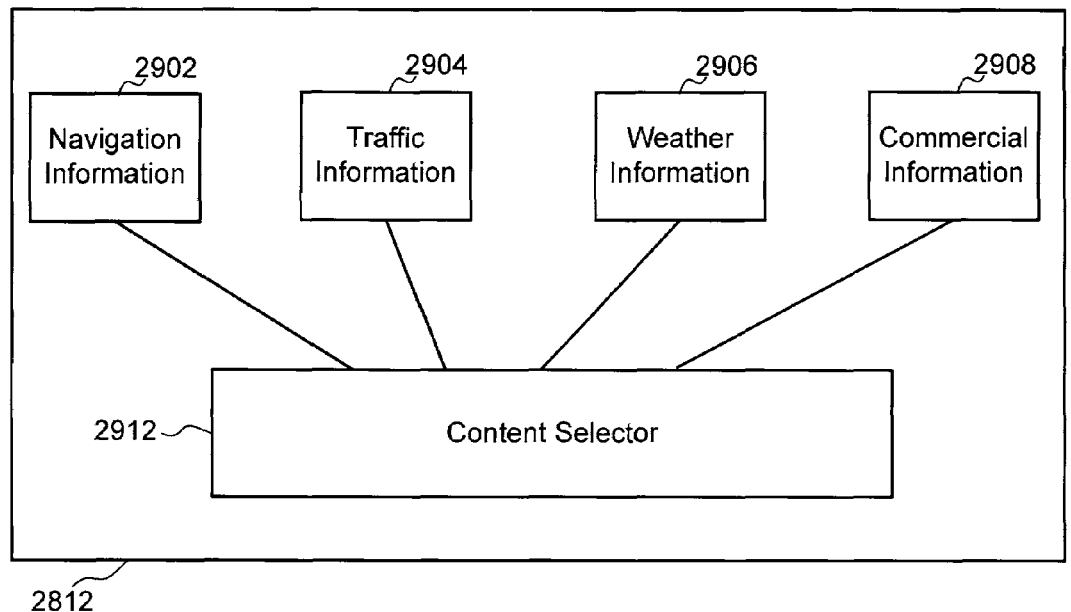
FIG. 29 is a schematic diagram of a preferred embodiment of content settings.

FIG. 29 is an enlarged view of content settings 2812. Content selector 2912 selects from one or more different types of content. In the embodiment shown in FIG. 29, four different forms or types of content are available, including navigation information 2902, traffic information 2904, weather information 2906, and other forms of information 2908. Other forms of information 2908 can include news and media, music, or any other type of information that is different than navigation, traffic or weather information. Content selection 2912 records or retains information related to the selected forms of content.

In some embodiments, users select the forms of content they wish to receive and their selections are retained by content selector 2912. In other embodiments, a user's content selection is managed by service provider 108. In these embodiments, service provider 108 may limit the available choices due to the type of equipment associated with the user. This is sometimes done because the user's equipment is incapable of receiving or processing a certain kind of information. Service provider 108 can also manage the choices available to different users based on their subscription. In these embodiments, different subscription levels permit users to gain access to different forms of information.

Figure 30:
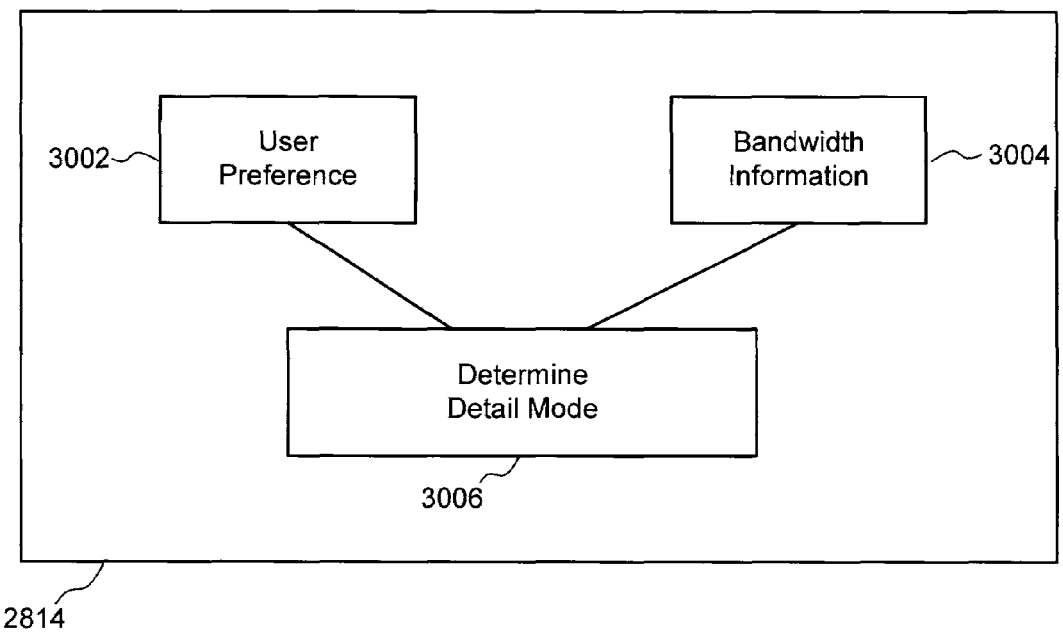
FIG. 30 is a schematic diagram of a preferred embodiment of content mode.

FIG. 30 is a schematic diagram of a preferred embodiment of content mode 2814. One aspect of content mode 2814 is related to bandwidth, network capabilities, and the ability of service provider 108 to communicate with an OBU. Different networks can provide different transmission speeds and these transmission speeds can also vary under different circumstances. There are a myriad of factors that can affect the performance of a network, one important factor is an OBU's position with respect to various network resources. Other factors include signal strength, whether the OBU is roaming or not, and the kind of cellular or wireless standard employed, for example, 2G, 3G, 4G, analog or 802.11x. Any of these factors can affect the overall transmission capability between service provider 108 and an OBU. In some embodiments, information related to these various factors are used to estimate available bandwidth and in other embodiments, the available bandwidth is determined by experimentation and feedback from the network. Regardless of which method is used to determine or estimate bandwidth, this information is stored as bandwidth information 3004.

Another aspect of content mode 2814 is user preference 3002. Users can select the amount of bandwidth and/or content they wish to receive. In some cases, user preference 3002 can be characterized in relative levels. There can be one, two or many different levels. In one embodiment, user preference 3002 includes three levels, a high, medium and low level. Given these three choices, users can select one of the levels and this selection is stored as user preference 3002.

In some embodiments, these different levels are associated with a subscription level so that users who pay for a higher subscription level can select a higher bandwidth level. Also, in some cases, wireless network providers may charge higher fees for access to higher bandwidth. In these cases, users may want to limit their bandwidth to avoid paying higher fees for wireless network access and usage. Users can also select different bandwidth levels under different conditions. For example, users can select a high bandwidth level while OBU is "in network," and select a different bandwidth level, for example low or medium, when OBU is out of network or roaming.

Information associated with user preference 3002 and information associated with bandwidth information 3004 is retrieved and a detail mode is determined in step 3006. Preferably, both user preference information 3002 and bandwidth information 3004 is used to determine detail mode 3006. However, bandwidth information 3004 may limit user preference 3002. For example, a user may select a high level of bandwidth, but if that level of bandwidth is not available due to network limitations or because there is no wireless network available that can support the selected bandwidth level, then determine detail mode step 3006 selects the highest available bandwidth in that situation. In some embodiments, determine detail mode 3006 prepares information related to the bandwidth limitations to notify the user of the limited bandwidth. This bandwidth limitation information can be sent to the user.

Content settings information 2812 and content mode information 2814 can be used to determine a user's content preferences in step 2802. In some embodiments, content settings information 2812 is used to determine a user's content preferences, in other embodiments, content mode information 2814 is used. And in still other embodiments, both content settings information 2812 and content mode information 2814 are used to determine a user's content preferences in step 2802.

In one embodiment, content settings information 2812 is used to determine what kinds of content a user has selected, and content mode information 2814 is used to determine the level of detail and/or the amount of content available to a user. The amount of content can be limited by a user's selection, subscription level or the bandwidth available to the user at a certain time, as disclosed above.

After a user's content preferences have been determined in step 2802, navigation and/or map information is prepared in step 2804. Preferably, navigation information can be prepared with two or more levels of detail. Preferably, each of these different levels of detail can be represented by different amounts of digital information. For example, navigation information having a first level of detail includes more detailed information than navigation information having a second level of detail. Consequently, navigation information having a first level of detail includes more content and requires more digital information. In some embodiments, navigation information having a second level of detail requires very little digital information. In some embodiments, this second level of detail includes text but does not include graphics. Some embodiments include navigation information that has a third intermediate level of detail.

Figure 31:
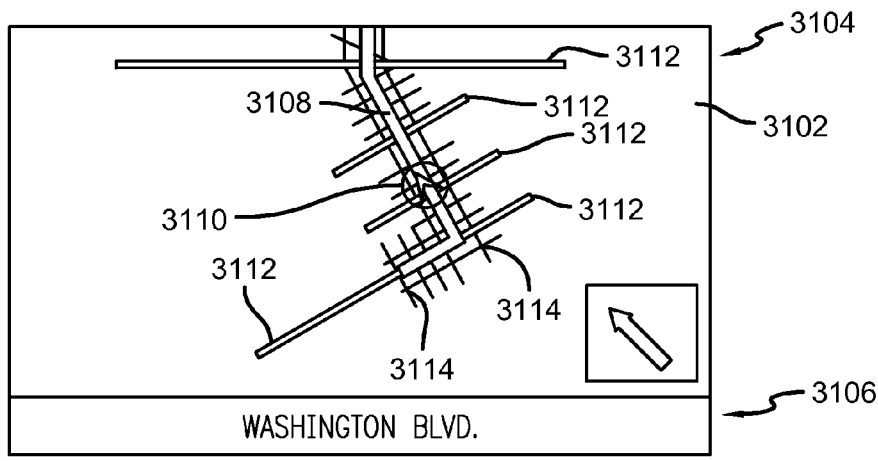
FIG. 31 is a schematic diagram of a preferred embodiment of a map including a high level of detail.
Figure 32:
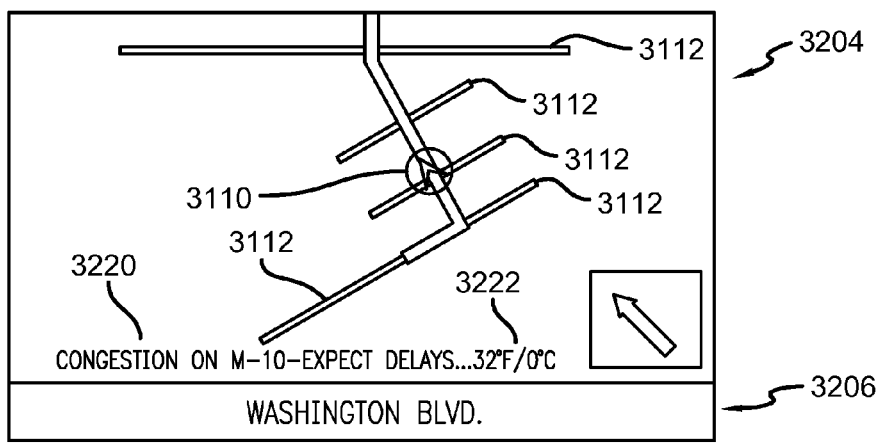
FIG. 32 is a schematic diagram of a preferred embodiment of a map including an intermediate level of detail.
Figure 33:
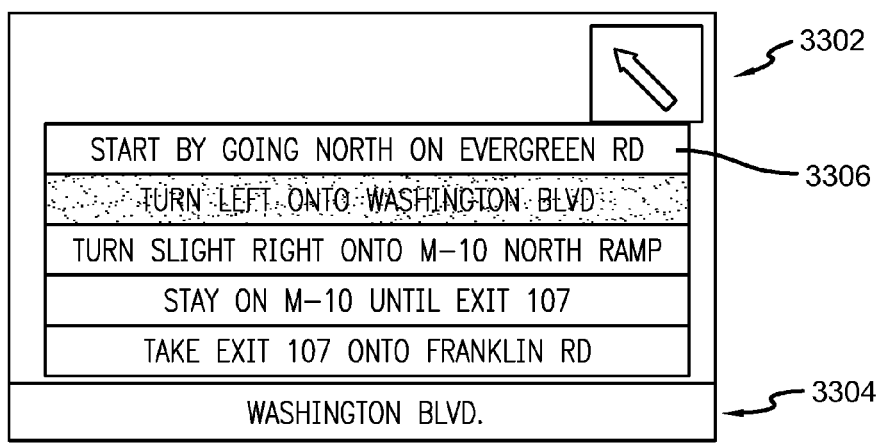
FIG. 33 is a schematic diagram of a preferred embodiment of a map including a low level of detail.

FIGS. 31 to 33 are schematic diagrams of preferred embodiments of navigation information. FIG. 31 is a preferred embodiment of high detail navigation information, FIG. 32 is a preferred embodiment of medium detail navigation information and FIG. 33 is a preferred embodiment of low detail navigation information.

FIG. 31 is a schematic diagram of information displayed by display 326 (see FIG. 3) and includes map 3102 in first region 3104 and second region 3106 that includes text. First region 3104 and second region 3106 are displayed by display 326. Map 3102 includes highly detailed navigation information. In some embodiments, map 3102 includes full information, meaning that map 3102 includes all of the information service provider 108 (see FIG. 1) is capable of providing. In other embodiments, map 3102 includes less than full information.

Map 3102 includes route 3108 and indicia 3110 associated with a motor vehicle. In a preferred embodiment, indicia 3110 is associated the motor vehicle 100 (see FIG. 1) in which map 3102 is displayed. In other words, indicia 3110 is used to represent the current position of motor vehicle 100 on map 3102. Map 3102 also includes several primary roads 3112 and several secondary roads 3114. In the example, shown in FIG. 31, map 3102 includes highly detailed navigation information and all or most of the available navigation information is shown in map 3102.

FIG. 32 is a schematic diagram of information displayed by display 326 (see FIG. 3) and includes map 3202 in first region 3204 and text in second region 3206. Map 3202 includes an intermediate amount of detail. Map 3202 includes indicia 3110, route 3108 and major roads 3112, like map 3102. However, map 3202 does not include some navigation information that is provided with map 3102. Any items of navigation information can be omitted, but in the example shown in FIG. 32, secondary roads are omitted. The resulting map 3202 can be represented using less digital information than map 3102. In a preferred embodiment, no route information is ever omitted.

FIG. 33 is a schematic diagram of information displayed by display 326 (see FIG. 3) and includes first region 3302 and text in second region 3304. In this embodiment, navigation information is provided in text 3306 in first region 3302. Preferably, text 3306 provides driving directions that correspond to route 3108 in map 3202 and map 3102. While some embodiments can include some graphics along with text 3306 directions, it is preferred that only text 3306 is provided and that graphics are not sent by service provider 108 to the OBU. Because this embodiment provides text-based directions, navigation information of this embodiment can be represented using even less digital information than map 3202.

In some embodiments, traffic information can be provided. This is an option and need not be provided. In other words, some embodiments provide traffic information while others do not. As disclosed above, navigation information can be provided in different amounts of detail. Traffic information can be provided regardless of the level of detail of the navigation information. Additionally, traffic information content can be adjusted to correspond with the level of detail of the navigation information. The level of detail of traffic information can also be independent from the level of detail of the navigation information, and traffic information can have a different level of detail than navigation information.

Referring to FIG. 32, traffic information can be provided in first region 3104 or second region 3106. Preferably, traffic information is in the form of streaming text just above second region 3106. Traffic information can include all traffic information for a particular geographic region, traffic information along a particular route or along a selected route.

Traffic information can appear in any desired location. FIG. 32 shows a preferred location for traffic information 3220. In the embodiment shown in FIG. 32, traffic information 3220 appears as scrolling text near the bottom of first region 3204. Although traffic information 3320 is only shown in connection with intermediate detail map 3202, traffic information 3220 can be provided with any map having any level of detail including map 3102 and map 3302, for example.

In step 2806 traffic information can be prepared. Like other steps, this is an optional step and need not be performed. Traffic information can be gathered by service provider 108, sent to service provider 108 or produced by service provider 108. Regardless of how the traffic information is ultimately obtained, traffic information is preferably prepared as a stream of information. This stream can include text, symbols and/or graphics.

Preferably, the frequency of traffic information updates is related to the different levels of detail. Generally, if a high level of detail has been selected for traffic information, then frequent updates are sent by service provider 108. Conversely, if a low level of detail has been selected for traffic information, then less frequent updates are sent by service provider 108. In some embodiments, the level of detail of traffic information corresponds with the level of detail of the navigation information. However, in other embodiments, it is possible to select a level of detail for traffic information that is different than the level of detail of the navigation information.

Returning to FIG. 28, in step 2808, other information can be prepared. Like other steps, this step is optional and need not be performed. In this step, any desired information can be sent by service provider 108. One example of another kind of information that can be sent includes weather information.

Weather information can be displayed in any desired location. Preferably, however, weather information is displayed along with traffic information. Referring to FIG. 32, weather information 3222 is displayed as streaming text along with traffic information 3220. Preferably, weather information is streamed with traffic information and can appear at the end of traffic information 3220. Weather information can be provided regardless of the level of detail of the associated map. Although weather information 3322 is only shown in connection with intermediate detail map 3202, weather information 3222 can be provided with any map having any level of detail including map 3102 and map 3302, for example.

Returning to FIG. 28, dummy data can be prepared in step 2810. Like other steps, this step is optional and need not be performed. Referring to FIG. 1, dummy data refers to information that is sent by either service provider 108 or an OBU associated with motor vehicle 100. Dummy data is data that is sent to maintain a connection between the OBU associated with motor vehicle 100 and service provider 108.

In some instances, wireless network 106 manages communications between parties that use wireless network 106 to communicate with one another. In some cases, wireless network 106 will attempt to conserve network resources by terminating communications sessions that appear to be idle or completed. These communications networks monitor the activity of a connection between two parties. If there is no activity for a predetermined period of time, wireless network 106 will assume that the communications session has been completed and for some reason, the connection between the two parties was not properly terminated. Based on this assumption, and to conserve network resources, wireless network 106 may terminate the connection between the two parties if there is perceived inactivity for the predetermined period of time.

If the connection between the OBU in motor vehicle 100 and service provider 108 is terminated, the connection must be reestablished in order for those two systems to communicate with one another. Generally, it takes time for the two systems to reestablish communications through wireless network 106. Because of the operating context of the OBU—the OBU is generally located in a moving vehicle—this delay can sometimes be unacceptably long, and can adversely affect the performance of the OBU.

In order to prevent this time lag in establishing a connection, dummy data can be sent between service provider 108 and the OBU. Either service provider 108 or OBU 500 (see FIG. 5) can send dummy data. In some embodiments, both service provider 108 and OBU 500 send dummy data, in others only one of those systems sends dummy data.

Preferably, the transmission of dummy data is timed so that wireless network 106 assumes a communications session is in progress and does not, on its own initiative, terminate the connection. This means that either service provider 108 or OBU 500 transmits data through wireless network 106 at certain time intervals. These time intervals are preferably selected so that wireless network 106 does not terminate the connection between service provider 108 and OBU 500.

Figure 34:
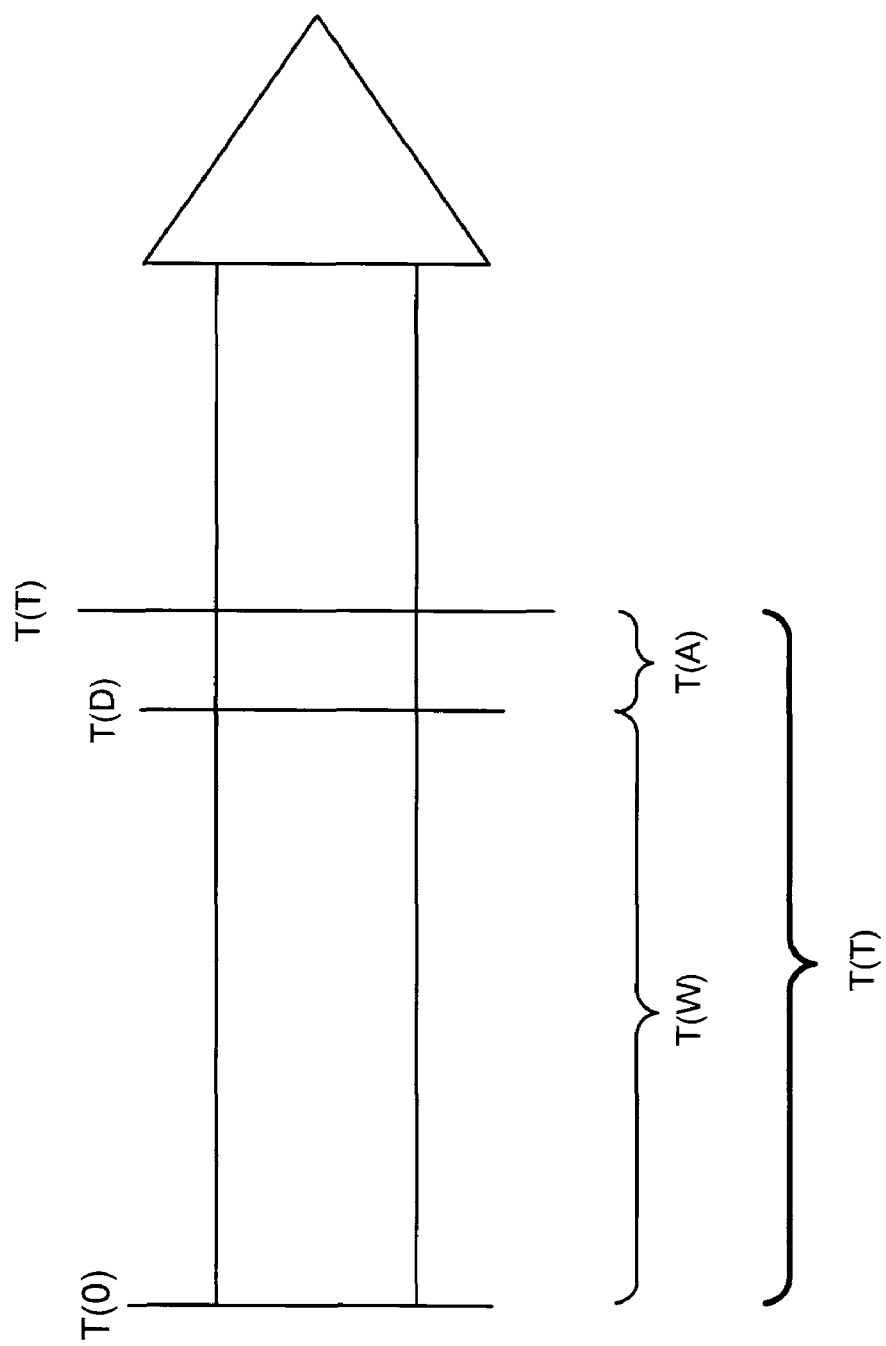
FIG. 34 is a schematic diagram of a preferred embodiment of a timeline for transmitting information.

Referring to FIG. 34, which is a schematic diagram of a time line of network activity, time line 3402 starts at an initial time T(0). Initial time T(0) can be any initial time, including the beginning of network activity, for example, when a connection is established between service provider 108 and the OBU, or the conclusion of network activity, as disclosed below. In any case, an initial time T(0) is considered. T(T) represents the time of termination. At this time, wireless network 106 is designed to terminate a connection between service provider 108 and OBU 500 due to perceived inactivity. Preferably, a transmit data time T(D) is established. As shown in FIG. 34, T(D) is preferably before time of termination T(T). The time between initial time T(0) and transmit data time T(D) is defined as waiting time T(W).

In the embodiment shown in FIG. 34, if there is some kind of network activity during waiting time T(W), for example, data is sent from or to service provider 108, then initial time T(0) is set after that network activity has concluded. However, if there is no network activity during waiting time T(W), then transmit data time T(D) occurs and dummy data is sent through network 106. T(D) preferably occurs before time of termination T(T) so that wireless network 106 does not have an opportunity to terminate the connection between service provider 108 and OBU 500.

As shown in FIG. 34, transmit data time T(D) can be placed a certain time, referred to as accommodation time T(A) before time of termination T(T). Accommodation time T(A) provides time for any possible delays in sending the dummy data. Preferably dummy data is ignored and has no effect on the receiving party.

Some embodiments include provisions for processing off route conditions. An off route condition is where a user has driven a vehicle off a predetermined route. This can occur when the user misses a turn or turns at the wrong intersection.

Referring to FIGS. 35-39, FIG. 35 is a schematic diagram of a preferred embodiment of display 326 showing a map 3502. FIGS. 35-39 show schematic diagrams of preferred embodiments of instances of an overall map (not shown). These instances show various portions of the overall map and show those portions of the overall map rendered at various scales or zoom factors. While the term "map" is used for clarity, it should be kept in mind that the following maps in FIGS. 35-39 are actually instances or portions of an overall map.

Figure 35:
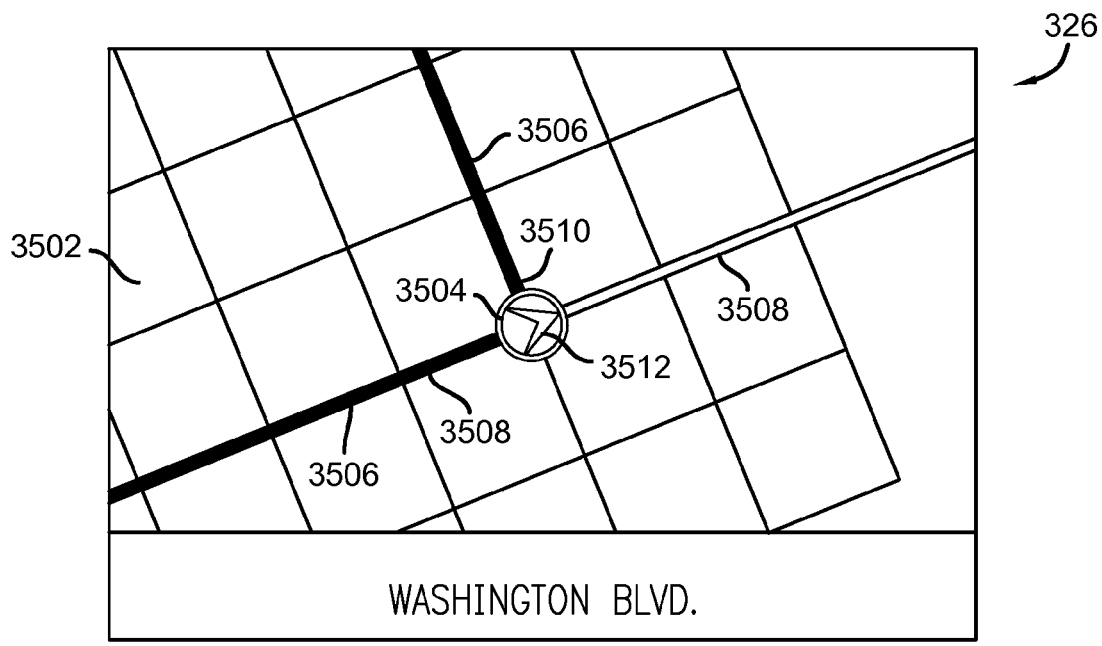
FIG. 35 is a schematic diagram of a preferred embodiment of a map.

Map 3502 includes indicia 3504 representing a motor vehicle. Preferably, map 3502 is displayed within the motor vehicle represented by indicia 3504. Map 3502 includes a route 3506. Route 3506 includes first street 3508 and second street 3510. FIG. 35 shows indicia 3504 at the intersection 3512 of first street 3508 and second street 3510. According to route 3506, the driver is supposed to proceed eastward on first street 3508 and then turn left, heading northward, on second street 3510. Thus, the driver is supposed to turn left at this intersection 3512.

Figure 36:
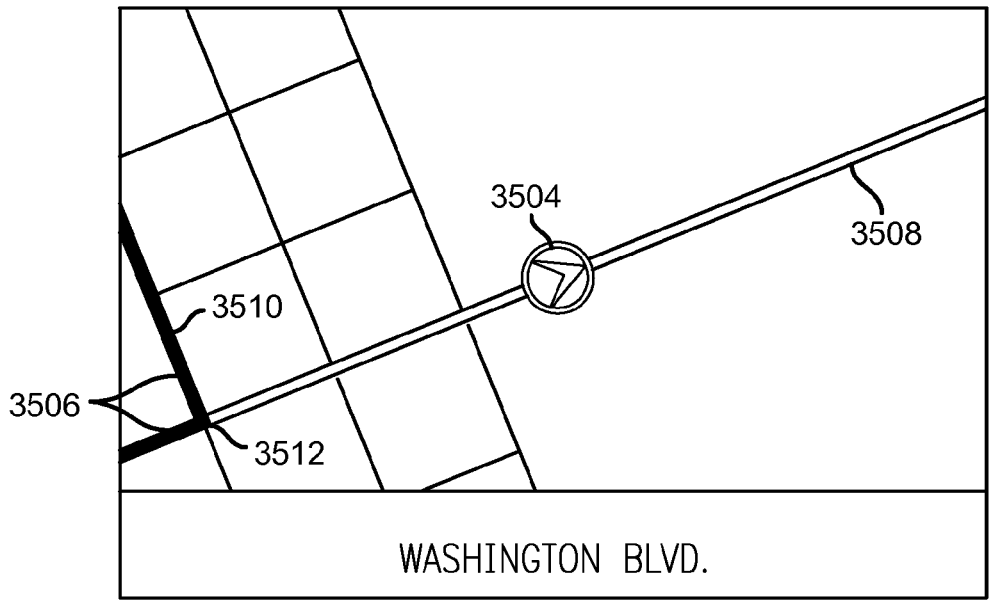
FIG. 36 is a schematic diagram of a preferred embodiment of a map.

FIG. 36 is a schematic diagram of a preferred embodiment of a map 3602. Map 3602 shows the position of indicia 3504 after the associated motor vehicle missed the left turn at intersection 3512. After failing to turn left onto second street 3510, the driver has continued eastward on first street 3508 causing indicia 3504 to be spaced from route 3506. Because indicia 3504 is now significantly spaced from route 3506, the system may determine that the motor vehicle is in an off route condition.

The system can use many different kinds of methods to determine off route conditions. In some embodiments, motor vehicle position information is compared with route information and any significant deviation from the route is considered an off route condition. Some embodiments include a tolerance where slight or insignificant differences between the motor vehicle position information and the route information are ignored.

In some embodiments, off route conditions are determined by OBU 500 (see FIG. 5) and in other embodiments, off route conditions are determined by service provider 108 (see FIG. 2). In those embodiments where off route conditions are determined by service provider 108, motor vehicle position information can be sent by OBU 500 to service provider 108. In some embodiments, this motor vehicle position information can include GPS information.

Preferably, indicia 3504 remains at a location that is relatively fixed with display 326 while the map scrolls to simulate motion of indicia 3504 with respect to the map. Usually a generally central location on display 326 is selected for indicia 3504, however, some embodiments place indicia 3504 in a different location.

Figure 37:
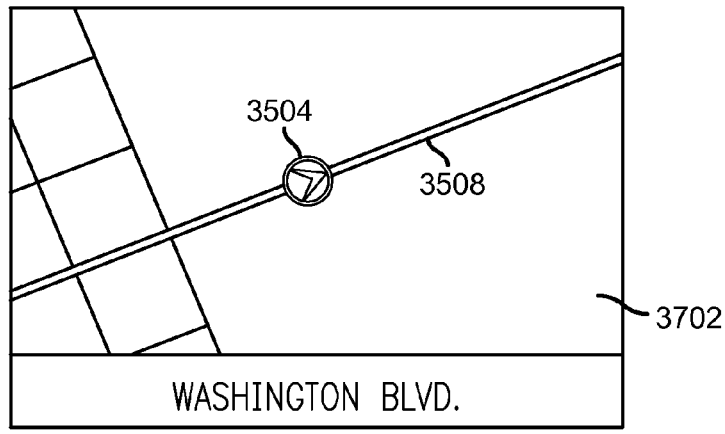
FIG. 37 is a schematic diagram of a preferred embodiment of a map.

Map 3702 shown in FIG. 37, indicia 3504 has moved further away from route 3506 and route 3506 is no longer visible in FIG. 37. In this condition, route 3506 cannot be seen and this can make it difficult for the driver to find and return to route 3506. Because of this difficulty, and because it is desirable to keep route 3506 and indicia 3504 visible, some embodiments include provisions to maintain indicia 3504 and route 3506 visible on display 326. In some embodiments, these provisions can include a modification of some kind.

Figure 38:
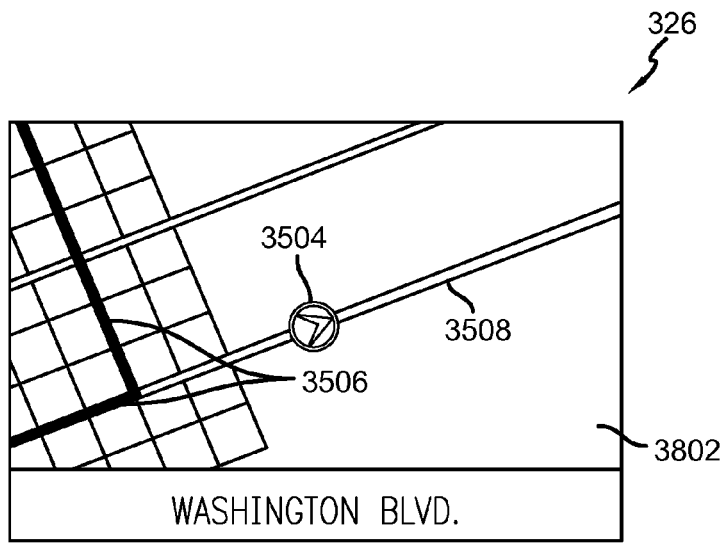
FIG. 38 is a schematic diagram of a preferred embodiment of a map.

In one embodiment, the scale of the map is altered so that the indicia and the route remain visible on one screen. An example of this feature is shown in FIG. 38. As shown in FIG. 38, map 3802 has a different scale than map 3702. The scale is such that items appear smaller but a larger portion of the overall map is visible. In colloquial terms, map 3802 has been "zoomed out" relative to map 3702.

Although any scale or zoom factor can be selected, preferably, a scale or zoom factor is selected so that both route 3506 and indicia 3504 are visible when map 3802 is rendered on display 326. Compare FIGS. 37 and 38. In FIG. 37, Also, the scale or zoom factor can be dynamic and change as indicia 3504 moves relative to route 3506. As indicia 3504 moves further away from route 3506, the scale or zoom factor is increased, meaning the perspective of the map can be further zoomed out and a larger portion of the overall map displayed.

It is also preferred that the reverse occurs. As indicia 3504 moves closer to route 3506, the scale or zoom factor is decreased and perspective of the map is zoomed in. Preferably, this continues until the scale or zoom factor returns to its original condition.

In another embodiment, a modification is made to the position of the indicia so that both the indicia and the route are visible at the same time on a one screen. Recall that preferably, indicia 3504 remains at a generally central location that is relatively fixed with display 326 while the map scrolls to simulate motion of indicia 3504 with respect to the map. In this embodiment, indicia 3504 moves from its generally fixed position.

Figure 39:
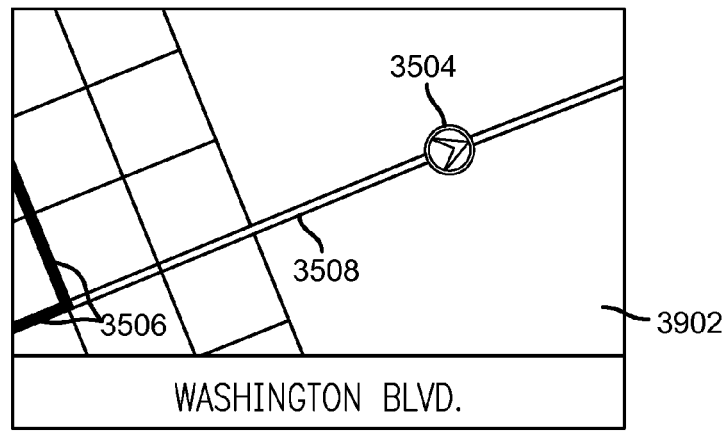
FIG. 39 is a schematic diagram of a preferred embodiment of a map.

FIG. 39 is a schematic diagram of a preferred embodiment of map 3902. In this embodiment, indicia 3504 has been moved from its generally central location to a different location. This can be observed by comparing FIGS. 36 and 39. Compare also FIGS. 37 and 39. FIGS. 37 and 39 are rendered in substantially similar scale. However, because indicia 3504 in map 3702 of FIG. 37 is retained in a central position, route 3506 is not visible. Turning to FIG. 39, in this embodiment, indicia 3504 has been moved from its fixed central position on map 3902. By doing this, both route 3506 and indicia 3504 are visible on map 3902. Preferably, as indicia 3504 returns to route 3506, it eventually again assumes a central position on map 3902.

Figure 40:
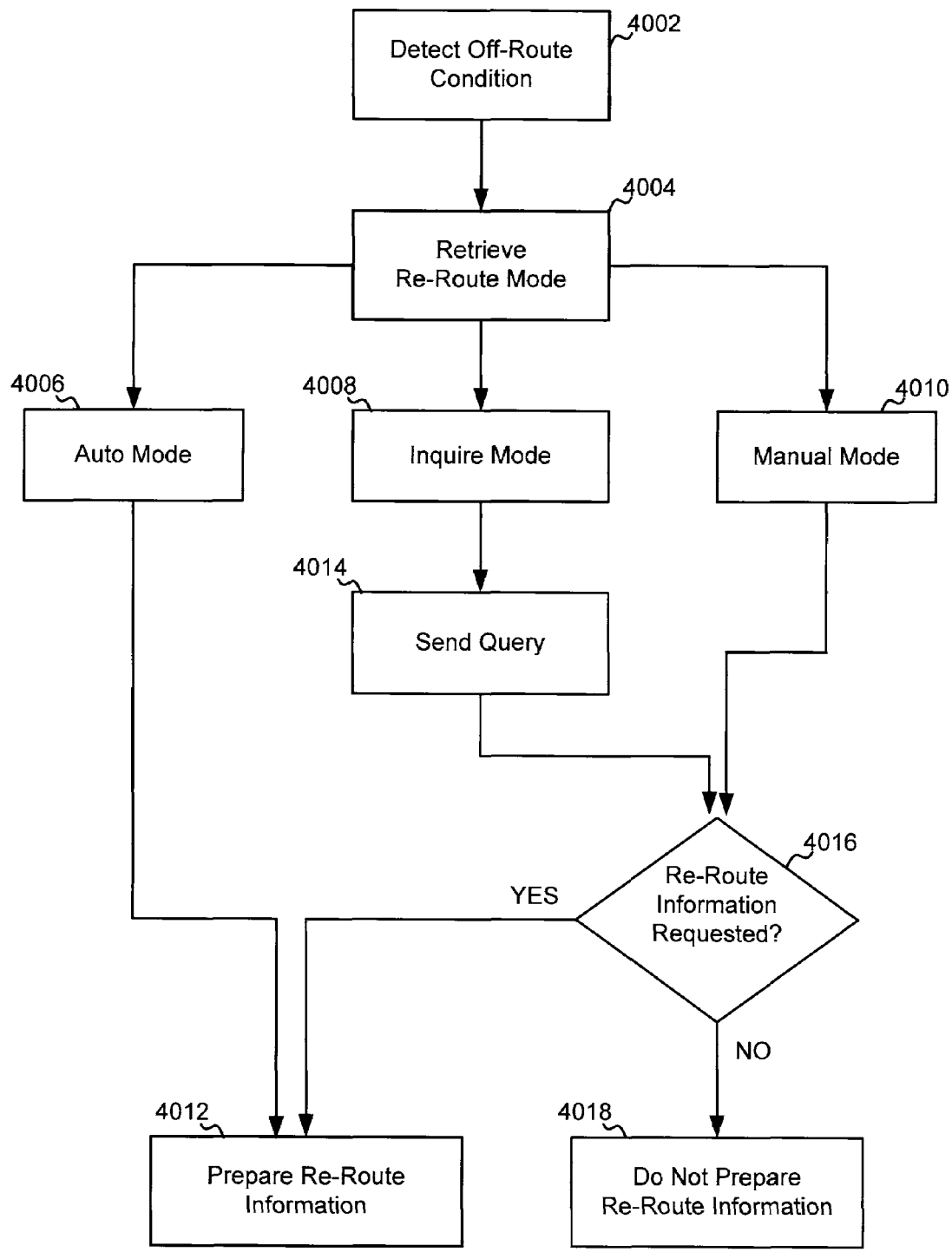
FIG. 40 is a flow diagram of a preferred embodiment of a process for processing off route conditions.

FIG. 40 is a flow diagram of a preferred embodiment of a method for processing off route conditions. The process can begin in step 4002 where an off route condition is detected. This off route condition can be detected by OBU 500 or by service provider 108. Off route conditions can be detected by determining a difference between a motor vehicle's position and route 3506. In some embodiments, where service provider 108 determines off route conditions, motor vehicle position information can be sent to service provider 108 by OBU 500. This position information can include GPS information collected by OBU 500.

Re-route information refers to information, driving directions and other assistance that can be provided after an off route condition has been detected. Re-route mode refers to a protocol, procedure or process for providing re-route information. Some embodiments use a single, pre-determined re-route mode while other embodiments support multiple re-route modes. In a preferred embodiment, multiple re-route modes are available. In step 4004 information related to a re-route mode is retrieved. Preferably, three possible re-route modes are available: auto, inquire and manual. In step 4004 information related to a selection of one of these re-route modes is retrieved. After re-route mode information has been retrieved, the process continues down the selected branch.

Step 4004 can occur before step 4002 in some embodiments. In those embodiments, re-route mode information is stored and the process waits for a detected off route condition. After the off route condition is detected, the process proceeds to the desired off route mode branch.

In step 4006, the process enters an automatic mode. In auto mode, the process automatically provides re-route information without further user participation. In embodiments where the off route condition is determined by OBU 500, it is preferred that OBU 500 send a request to service provider 108 to prepare and send re-route information. In embodiments where the off route condition is determined by service provider 108, it is preferred that re-route information is prepared and sent by service provider 108 to OBU 500 after the off route condition has been determined. Details regarding the preparation of re-route information are disclosed in connection with step 4012.

The process enters an inquire mode in step 4008. In this mode, the process does not automatically provide re-route information, but instead waits for instructions from a user. In step 4014, a query is sent to the user. This query asks the user if re-route information is needed or desired. In some embodiments, information related to the off route condition is provided to the user. In some cases, this information can be in the form of an alert or notice either visual or audible, that the motor vehicle is off route.

After the query is sent to the user, the process moves on to step 4016 where the process waits for re-route instructions from the user. If the user requests re-route information, then the process proceeds to step 4012, where re-route information is prepared. If the user does not request re-route information, then the process goes to step 4018 where the process does not provide re-route information.

Returning to step 4004, if a manual mode is selected, the process enters manual mode in step 4010. In manual mode, the process simply waits for a request for re-route information. Some users may find queries and requests for instructions distracting or annoying, so in manual mode, no query or request for instructions is made to the user.

Manual mode goes directly to step 4016 where a request in step 4016 the process waits for a request for re-route information. As disclosed above, if a request is made, then the process proceeds to step 4012 where re-route information is prepared. If no request is made, then the process moves on to step 4018 where no re-route information is provided.

In some embodiments, step 4016 can also include a timeout feature. The timeout feature waits a predetermined period of time, and after that time, if no selection or request is received from the user, the process assumes that no request for re-route information has been made. In some embodiments, this timeout can be accompanied by an alert, either audible or visual, notifying the user that the system has assumed no re-route information is desired and/or no re-route information will be provided.

In step 4012 re-route information is prepared. Although this re-route information can be prepared in any suitable way, a preferred method for preparing re-route information is disclosed below.

In 4014 service provider 108 sends an inquiry to the OBU to determine if re-route information is desired.

Figure 41:
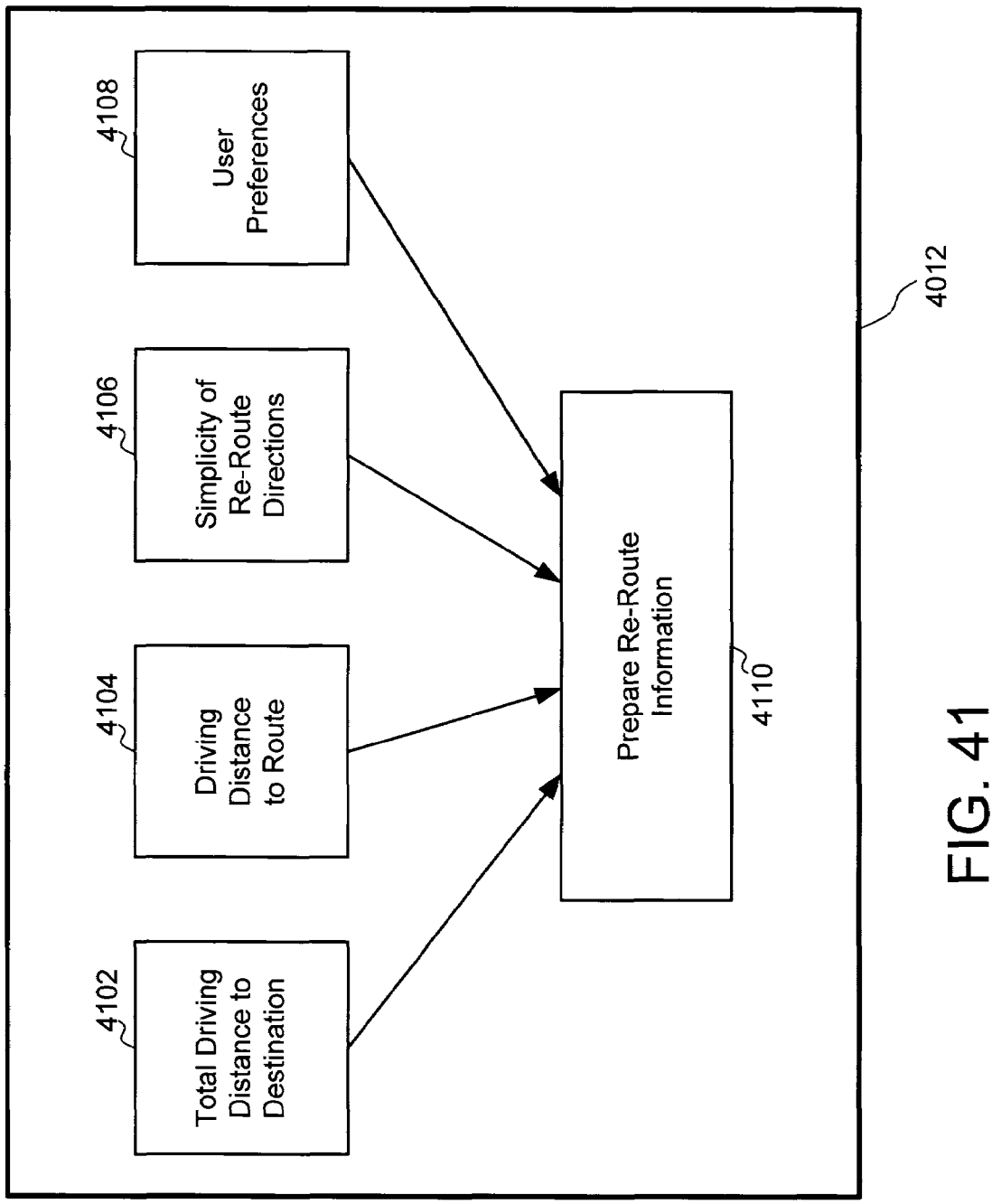
FIG. 41 is a schematic diagram of a preferred embodiment of a process for preparing re-route information.

FIG. 41 is an enlarged view of step 4012, where re-route information is prepared. FIG. 41 includes a schematic diagram of a system for preparing re-route information. Preferably, one or more factors are considered when preparing re-route information. In some embodiments, multiple factors are considered when preparing re-route information. In the preferred embodiment shown in FIG. 41, four factors are considered when re-route information is prepared. However, there are other embodiments that consider one or several of the following factors.

The first factor is total driving distance to destination 4102. This factor considers the total driving distance to the destination from the current off route location. This factor can consider the total driving distance for each of the various re-route possibilities. In some cases, proposed re-routes do not return to the original route, while in other cases, the proposed re-route does return to the original route. In cases where the proposed re-route returns to the original route, the re-route may or may not return to the exact point of departure. In other words, there can be re-routes that return to a different location along the original route than the point of departure. A user can select a minimum total driving distance to the destination from the present off route location.

The second factor is driving distance to route 4104. In this factor, total driving distances from the current off route location to the original route are considered. Like the first factor, proposed re-routes may or may not return to the exact point of departure. In other words, there can be re-routes that return to a different location along the original route than the point of departure. A user can select a minimum total driving distance to the original from the present off route location.

The third factor is simplicity of re-route directions 4106. In this factor, the simplicity or complexity of a proposed re-route is considered. This factor can consider the total number of turns, avoiding turns that are difficult to see, avoiding roads that are difficult or confusing to navigate, for example, roads with express and local lanes, and other unconventional or confusing situations.

The fourth factor is user preferences 4108. In this factor, any preset or received user preferences are considered. Some user preferences include: avoid highways, simplicity level, travel time to destination, travel time to route, avoid traffic lights, avoid left turns, and any other user preference.

As disclosed above, one, several or all of the factors can be used to prepare re-route directions. In a preferred embodiment, all of the factors are used to prepare re-route directions and information in step 4110. It is also possible to vary the weight accorded to each of the factors. For example, some users always want the shortest distance to the destination. In this case, first factor 4102 may be weighed at 100% while all of the other factors would be weighted at 0%. Some users may prefer a relatively short but simple return to the original route. In this case, first factor 4102 may be weighed at 0%, second factor 4104 may be weighed at 70%, third factor 4106 may be weighed at 20%, and user preferences may be weighed at 10%. All of these factors would be considered in analyzing all of the various re-route possibilities.

After re-route information is prepared in step 4110, the re-route information is preferably displayed on display 326. In those embodiments where re-route information is prepared in a separate location from OBU 500, re-route information is sent to OBU 500 after it is prepared in step 4110.

Some embodiments include provisions to enhance the interaction between a user and an OBU. While these features are adaptable to any navigation system, they are particularly useful when used in conjunction with the present system.

Referring to FIG. 5, the following features generally occur in OBU 500. Specifically, in some embodiments, these features are associated with step 520 where output to a user is provided and users interact with OBU 500.

Figure 42:
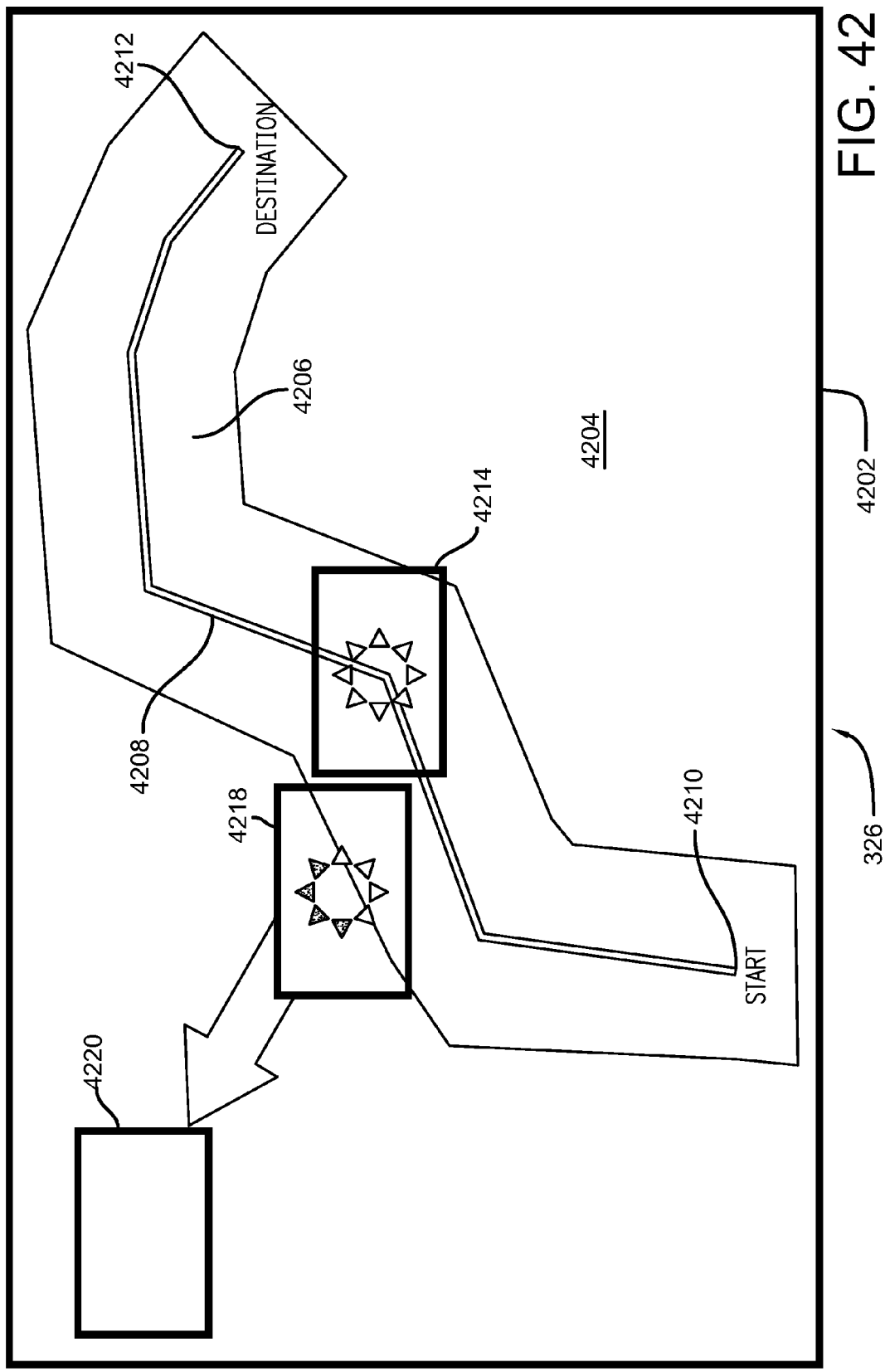
FIG. 42 is a schematic diagram of a preferred embodiment of a map.

Referring to FIGS. 3, 5 and 42, FIG. 42 is a schematic diagram of a preferred embodiment of display 326. In this embodiment, display 326 is configured to display map 4202. Display 326 is associated with OBU 500, which includes an input port 328. As disclosed above, input port 328 is configured to receive input information from a user.

Map 4202 preferably includes an indicia. Any desired indicia can be used, and many different types of indicia can be provided. Preferably a controllable indicia 4214 is provided for use with map 4202. Controllable indicia 4214 is also preferably displayed on map 4202.

Controllable indicia 4214 can include controls and positioning features that can be used to move controllable indicia 4214 about map 4202. In some embodiments, controllable indicia 4214 is controlled and moved in response to inputs received by input port 328. In one embodiment, controllable indicia 4214 is moved by pressing a series of buttons associated with central unit 302. These buttons can be disposed on central unit 302 or elsewhere. Preferably, inputs from these buttons are received by input port 328 regardless of where the buttons are located. It is also preferred that inputs from the buttons are each associated with a predetermined direction.

Some embodiments include a touch screen and controllable indicia 4214 is moved by interacting with the touch screen. Preferably, controllable indicia 4214 includes at least one associated on screen control. In the exemplary embodiment shown in FIGS. 42 and 44, controllable indicia 4214 includes frame 4402 and directional icons 4404. The exemplary embodiment includes eight (8) directional icons corresponding to eight predetermined directions. In the exemplary embodiment, the predetermined directions correspond to the following compass directions: North, North East, East, South East, South, South West, West, and North West.

Preferably, directional icons 4404 are displayed on a touch screen along with frame 4402. Preferably, controllable indicia 4214 is moved by touching one of the eight directional icons 4404. For example, in an exemplary embodiment, the North icon would be touched to move controllable indicia 4214 in a northern direction. Touching other directional icons 4404 would move controllable indicia 4214 in the corresponding direction.

In some embodiments, the motion and position of controllable indicia 4214 is limited. This can be done to retain controllable indicia 4214 within in predetermined boundary or within a boundary of some kind.

Referring to FIG. 42, map 4202 includes first region 4206 and second region 4204. First region 4206 encompasses route 4208, and second region 4204 is disposed outward of first region 4206 with respect to route 4208. Route 4208 includes a starting point 4210 and a destination point 4212.

Preferably, first region 4206 includes navigation information having a first level of detail and second region 4204 includes navigation information having a second level of detail. Preferably, the first level of detail is greater than the second level of detail, and in some embodiments, second region 4204 includes no navigation information. In the embodiment shown in FIG. 42, controllable indicia 4214 is disposed in a first position 4216 near route 4208 and within first region 4206. In this embodiment, controllable indicia 4214 is retained within first region 4206. To accomplish this, controllable indicia 4214 is not permitted to move beyond first region 4206. In other words, controllable indicia 4214 may not cross the boundary separating first region 4206 with second region 4204.

Consider a situation where a user wants to move controllable indicia 4214 in a North Westerly direction. Controllable indicia 4214 is moved to second position 4218 where it is near a boundary between first region 4206 and second region 4204. At this point, because the system has determined that controllable indicia 4214 is not permitted to leave first region 4206, the system will not allow controllable indicia 4214 to move into second region 4204. Thus, controllable indicia 4214 would not be permitted to move to third position 4220 in this embodiment.

Restricting the motion and position of controllable indicia 4214 can be done for many different reasons. In some cases, second region 4204 does not include navigation information and moving controllable indicia 4214 into second region 4204 would not yield any additional navigation information. In some embodiments, moving controllable indicia 4214 into second region 4204 acts to request additional navigation information from service provider 108. In some cases, this request of additional navigation information may not be desirable or feasible.

For example, consider a situation where OBU 500 is unable to establish communications with any wireless network. In this example, even if a request were made for additional information, service provider 108 would not receive the request and could not reply. Another example is where a user wants to avoid receiving navigation information beyond that of first region 4206. In this example, the user might have a subscription level that permits retrieval of navigation information associated with first region 4206 but charges additional amounts for retrieval of navigation information associated with second region 4204. In this example, the user may want to limit the motion and position of controllable indicia 4214 to avoid entering into second region 4204.

Some embodiments include provisions to assist the user in moving a controllable indicia. These provisions can include accepting imperfect or inaccurate commands to move the controllable indicia.

FIG. 43 is a schematic diagram of a preferred embodiment of controllable indicia 4214 on route 4208. In this embodiment, controllable indicia 4214 is disposed on a local position 4302 in route 4208. Like other embodiments, route 4208 includes a starting point 4210 and a destination 4212.

FIG. 44 is an enlarged view of controllable indicia 4214 in local position 4302. In embodiments that assist the user in moving controllable indicia 4214, imperfect or inaccurate commands may be accepted. At local position 4302, route 4208 includes a local direction towards the destination 4406 and a local direction towards the starting point 4408. In some cases, these directions can be local tangential directions towards destination 4212 or starting point 4210, respectively.

Rarely will a local direction correspond exactly with one of the preselected directions of directional icon 4404. This means that it is unlikely that a local direction towards either the destination or the starting point matches exactly with one of the directions of the directional icon 4404. In the embodiment shown in FIGS. 43 and 44, local direction towards destination 4406 is not exactly East. However, East icon 4410 most closely aligns with local direction towards destination 4406 and East icon 4410 is considered to correspond to local direction towards destination 4406.

Generally, in order to move controllable indicia 4214 towards destination 4212, the directional icon 4404 corresponding to the local direction towards the destination 4406 is pressed or touched. In the embodiment shown in FIGS. 43 and 44, the East icon 4410 is the directional icon 4404 that generally corresponds with the local direction towards the destination 4406.

In this embodiment, however, other directional icons, besides the one that most closely corresponds to the local direction towards the destination 4406 can also be pressed or touched to move controllable indicia 4214 towards destination 4212. Preferably, one or more adjacent directional icons can also be pressed and the system will still move controllable indicia 4214 towards destination 4212.

In the embodiment shown in FIGS. 43 and 44, East icon 4410 most closely corresponds to local direction towards destination 4406. Directional icon 4404 includes directions that are adjacent to East icon 4410. A first adjacent direction, North East icon 4414, disposed counter-clockwise of East icon 4410 and a second adjacent direction, South East icon 4416, disposed clockwise of East icon 4410. In this embodiment, the system accepts the input of directions adjacent to the most closely corresponding direction and will move controllable indicia 4214 towards destination 4212 if the direction most closely corresponding to local direction towards destination 4406 is received (in this embodiment this would be East icon 4414) or if either adjacent predetermined direction is received (in this embodiment the adjacent predetermined directions would be North East icon 4414 and South East icon 4416).

Similar features can be provided when moving controllable indicia 4214 towards starting point 4210. In this case, directional icon 4404 generally corresponding to the local direction towards the starting point 4408 is South West icon 4412. In addition to South West icon 4412, adjacent icons are also accepted and pressing those icons will also move controllable indicia 4214 towards starting point 4210. In the embodiment shown in FIGS. 43 and 44, corresponding South West icon 4412 has a first adjacent icon South icon 4418 disposed counter clockwise of South West icon 4412 and a second adjacent icon West icon 4420 disposed clockwise of it. In this embodiment, pressing any of those icons will move controllable indicia 4214 towards starting point 4210.

Figure 45:
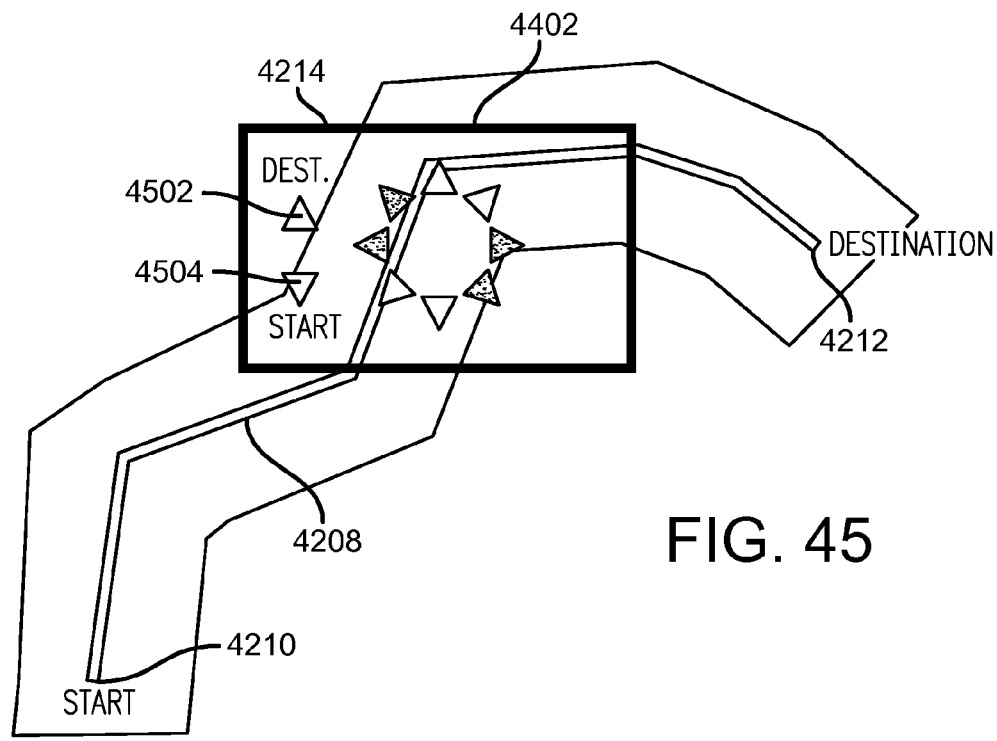
FIG. 45 is a schematic diagram of a preferred embodiment of a map.

Some embodiments include designated buttons to assist in moving the controllable indicia along a route. Preferred embodiments of these designated buttons can be seen in FIGS. 45 and 46. Controllable indicia 4214 includes destination direction button 4502 and start direction button 4504. Preferably, these buttons are associated with controllable indicia 4214, and in an exemplary embodiment, these buttons are disposed on screen within frame 4402 of controllable indicia 4214. Like other directional icons 4404, these buttons are preferably touchable on screen and move with controllable indicia 4214. These buttons can also be disposed in a fixed location on the screen. In operation, pressing destination direction button 4502 moves controllable indicia 4214 towards destination 4212 and pressing start direction button 4504 moves controllable indicia 4214 towards starting point 4210.

In some embodiments, the orientation of these designated buttons can be altered. In some cases, this is done to more closely align the designated button towards either the starting point or the destination. This can also be done to more closely align the designated buttons with local directions towards either the starting point or the destination.

Figure 46:
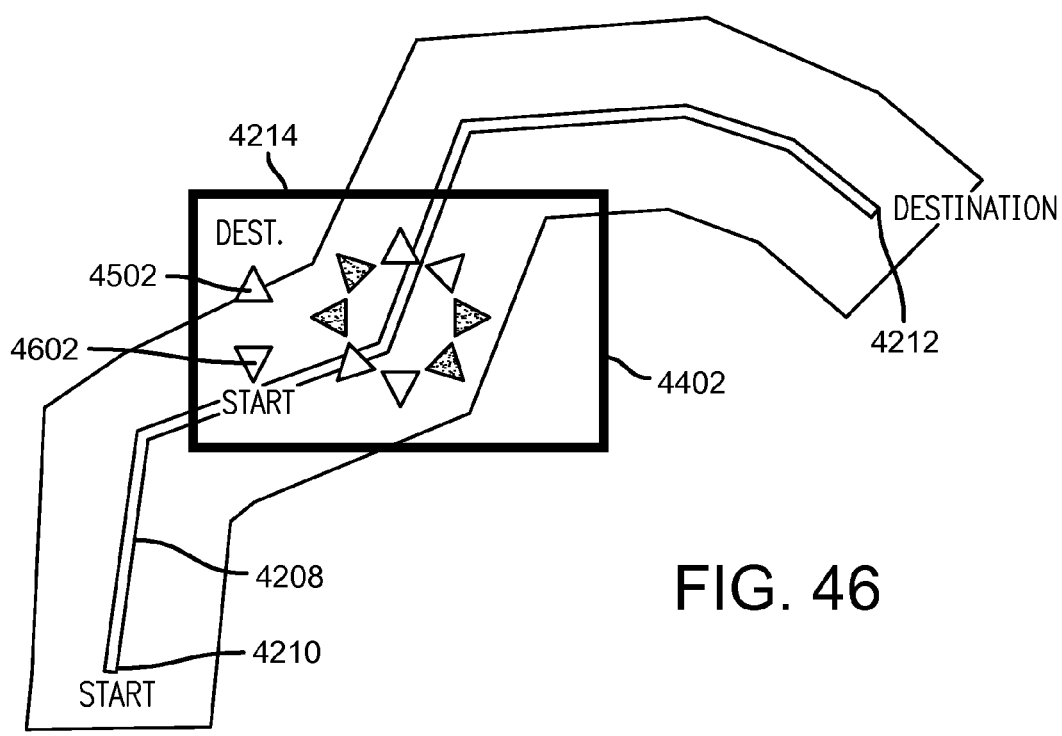
FIG. 46 is a schematic diagram of a preferred embodiment of a map.

An exemplary embodiment of this feature is shown in FIG. 46. In this embodiment, the orientation of start direction button 4602 has been altered. As shown in FIG. 46, start direction button 4602 points in a generally westward direction. In this case, west more closely aligns start direction button 4602 with a direction towards starting point 4210. In some embodiments, the orientation of the designated buttons can change as controllable indicia progresses along route 4208.

Some embodiments include provisions that provide enlarged views of certain portions of a map. This is often done when approaching an intersection or a turn. An enlarged view of the area near the intersection or turn is displayed to assist and direct the user through the intersection or turn. In some embodiments, however, this enlarged view is suppressed. Suppressing the enlarged view can help to conserve the amount of information sent by a service provider to an OBU or help to conserve computing resources of the OBU.

Figure 47:
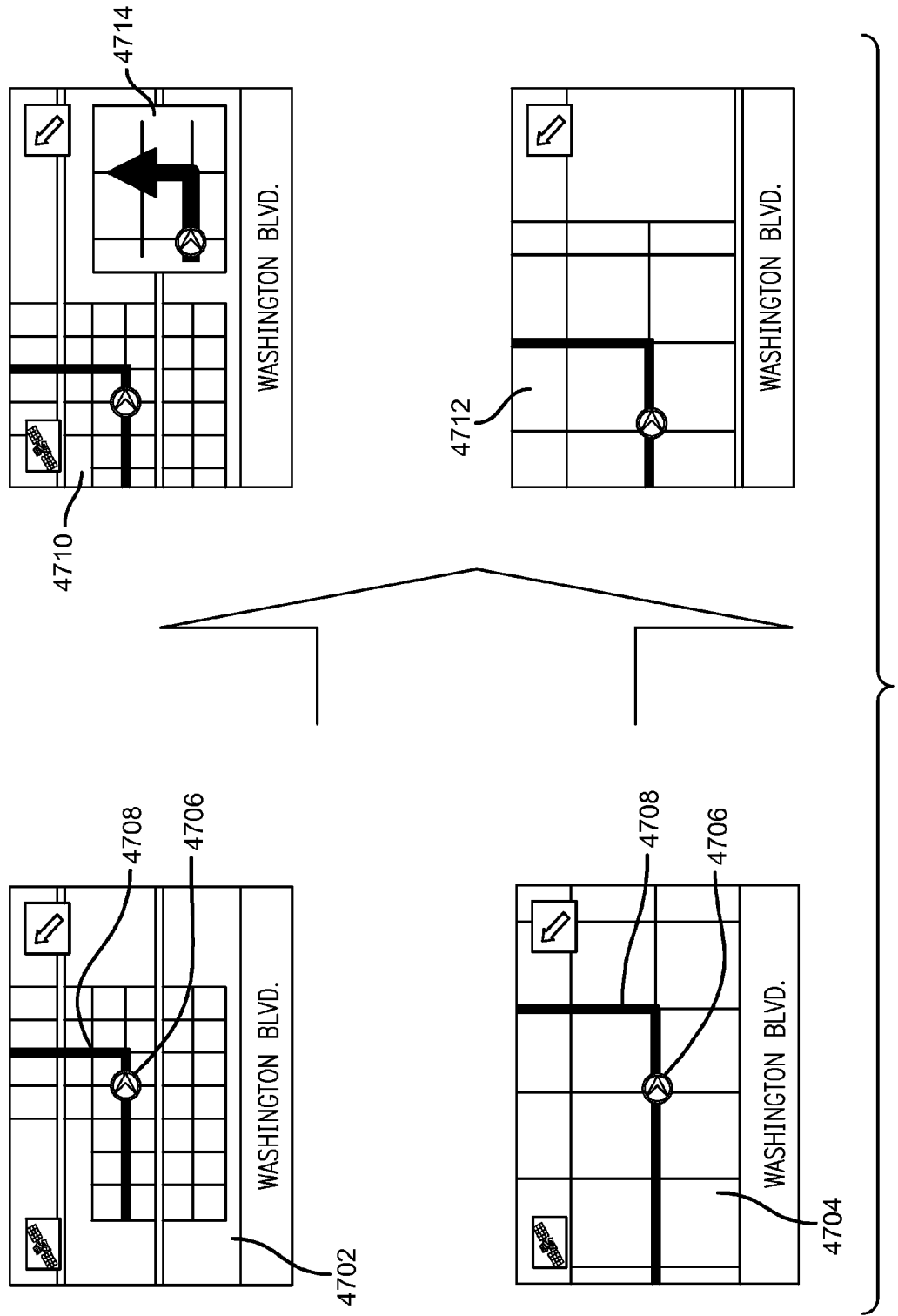
FIG. 47 is a schematic diagram of a preferred embodiment of a comparison including an enlarged view.

FIG. 47 is a comparison showing a preferred embodiment of a suppressed enlarged view. Map 4702 is a relatively large scale map, meaning a relatively large geographical area is shown in map 4702. Map 4704 is a relatively smaller scale map, meaning that map 4704 shows relatively less geographical area than map 4702. However, map 4704 shows indicia 4706 in a generally similar first position along route 4708 as map 4702.

Maps 4710 and 4712 are similar in scale as maps 4702 and 4704, respectively. Both maps 4710 and 4712 show indicia 4706 further along route 4708 in a second position as indicia 4706 is approaching a turn.

In some embodiments, an enlarged view 4714 is provided when indicia 4706 approaches a turn or other course altering situation. Enlarged view 4714 preferably provides a magnified view of an upcoming turn and can include directional arrows to assist the user. These visual aids can assist in providing the user with situational awareness and help to insure that the user make proper course altering maneuvers. However, in some embodiments, enlarged view 4714 is suppressed. In the embodiment shown in FIG. 47, enlarged view 4714 is preferably suppressed when the scale of the map is such that details of the turn or other maneuver are visible and enlarged view 4714 does not substantially enhance the situational awareness of the user.

Figure 48:
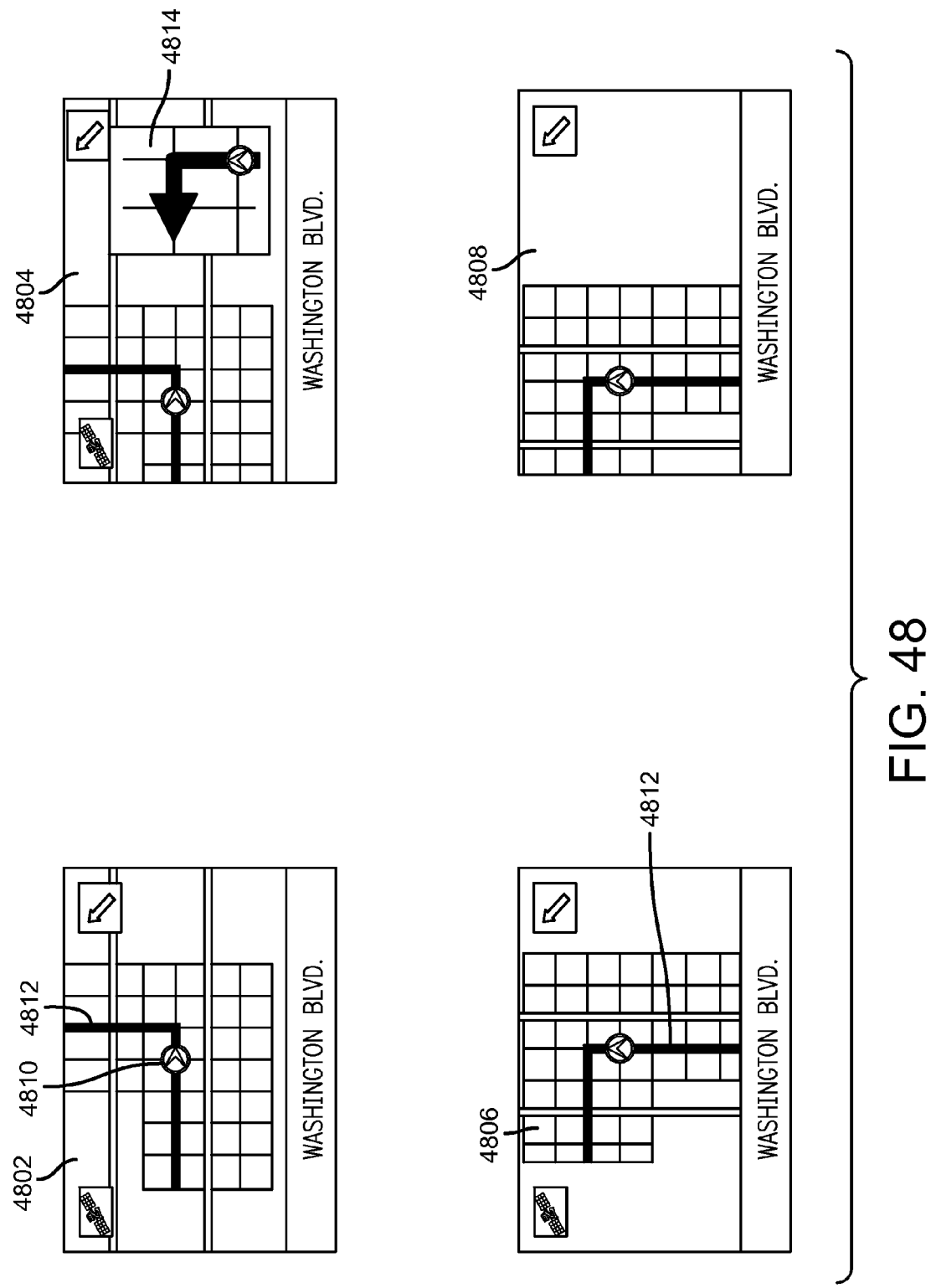
FIG. 48 is a schematic diagram of a preferred embodiment of a comparison including an enlarged view.

FIG. 48 is another comparison showing a preferred embodiment of a suppressed enlarged view. In this embodiment, the orientation of a map is used to determine if an enlarged view is suppressed or displayed. In FIG. 48 all of the maps 4802, 4804, 4806 and 4808 have a substantially similar scale, which is fairly large. The maps 4802, 4804, 4806 and 4808 show a fairly large area.

Map 4802 shows indicia 4810 on a first position on route 4812. Map 4802 is oriented in such a way that indicia 4810 is moving left to right. In this orientation, it can be confusing for a user to determine what turn to make to remain on route 4812. Because of this possible confusion, some embodiments provide enlarged view 4814. Preferably, enlarged view 4814 is oriented in such a way that a directional arrow associated with enlarged view 4814 corresponds to the direction of travel of the motor vehicle. The user can glance at enlarged view 4814 and quickly determine which turn to make to remain on route 4812.

Comparing maps 4802 and 4804 with maps 4806 and 4808, a criteria for suppressing enlarged view 4814 can be observed. Maps 4806 and 4808 are oriented in such a way that indicia 4810 is moving upwards. Orientation of maps 4806 and 4808 are substantially similar to enlarged view 4814. From this orientation, a user can glance at map 4806 and quickly determine which turn to make to remain on route 4812. Because of the orientation of maps 4806 and 4808, enlarged view 4814 provides little, if any, benefit in terms of situational awareness. Because of this, enlarged view 4814 is preferably suppressed in cases where a map, like maps 4806 and 4808, are oriented in a manner similar to that provided by an enlarged view. The suppression of enlarged view 4814 generally does not adversely affect the legibility of the driving directions or the situational awareness of the user. As shown in FIG. 48, an enlarged view is preferably suppressed in map 4808, thus conserving the amount of information that must be sent by service provider 108 to OBU 500, if information related to the enlarged view is sent, or conserving the computing resources of OBU 500, if information related to the enlarged view is produced locally by OBU 500.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A system for displaying navigation information comprising:
   a display displaying a map and an indicia, the indicia representing a motor vehicle;
   the map including major map features and minor map features;
   the display having a first region that displays the map with a first level of detail and a second region that displays the map with a second level of detail, wherein the first level of detail is greater than the second level of detail and wherein a boundary separates the first region and the second region, and wherein the first region and the second region include major map features and the second level of detail excludes at least one type of minor map features;
   the display further comprising a third region that displays the map with a lower level of detail than the second region;
   the system having a first condition wherein the indicia is on a route in the first region and wherein the indicia remains at a substantially fixed position with respect to the first region;
   the system having a second condition wherein the indicia is spaced from the route and wherein the indicia crosses the boundary from the first region to the second region and wherein a modification is made to keep the route and the indicia within the display.

2. The system according to claim 1, wherein the modification includes a change in scale of the map.

3. The system according to claim 2, wherein the scale is increased to show a larger geographical area as the indicia moves further away from the route.

4. The system according to claim 2, wherein the scale is decreased to show a smaller geographical area as the indicia moves closer to the route.

5. The system according to claim 2, wherein the scale is returned to an original scale when the indicia returns to the route.

6. The system according to claim 1, wherein the modification includes movement of the indicia from the fixed position.

7. The system according to claim 6, wherein the indicia returns to the fixed position when the indicia returns to the route.

8. The system according to claim 1, wherein the first region has a first size in a first portion of the display and a second size in a second portion of the display, wherein the first size is larger than the second size.

9. The system according to claim 1, wherein the third region includes no map features.

10. A system for displaying navigation information comprising:
    a central unit, wherein the central unit includes at least one provision for communicating with a communications network, memory, a processor, and a display port for interacting with a display;
    bandwidth information stored in the memory, wherein bandwidth information is information related to the overall transmission capabilities of the at least one provision for communicating with a communications network, wherein the central unit is configured to determine the bandwidth information;
    content mode information stored in the memory, wherein the content mode information includes a determination of the level of detail of navigation information available to the system, wherein the determination is based on the bandwidth information;
    the display displaying a map and an indicia, the indicia representing a motor vehicle;
    the display having a first region that displays the map with a first level of detail and a second region that displays the map with a second level of detail, wherein the first level of detail is greater than the second level of detail;
    the system having a first condition wherein the indicia is on a route in the first region;
    the system having a second condition wherein the indicia is spaced from the route and the indicia is permitted to enter the second region and wherein a modification is made to keep the route and the indicia on the display;

wherein the navigation information is received from a remote system connected to the system via the at least one provision for communicating with a communications network; and wherein the navigation information has been prepared for transfer to the system according to the level of detail of navigation information available to the system.

11. The system according to claim 10, wherein the remote system is configured to determine re-route information when the system is in the second condition.

12. The system according to claim 11, wherein the remote system and the system are configured to be connected via a connection system.

13. The system according to claim 12, wherein the connection system is configured to monitor a connection between the remote system and the system.

14. The system according to claim 13, wherein the connection system is configured to determine a waiting time between an initial time and a time of delivery, and wherein the connection system in configured to determine whether activity has occurred during the waiting time.

15. The system according to claim 14, wherein the remote system is configured to send dummy data to the system if no activity has occurred during the waiting time.

16. The system according to claim 11, wherein the system is configured to receive information related to a selected re-route mode.

17. The system according to claim 16, wherein the remote system is configured to execute an off route process based on the selected re-route mode when the system is in the second condition.

18. A system for displaying navigation information comprising:
an on-board unit (OBU), wherein the OBU includes a communication port for receiving information from a wireless communications network via a wireless communication link, memory, and a processor;
bandwidth information stored in the memory, wherein the bandwidth information is a transmission capability of the wireless communication link, wherein the processor is programmed to determine the bandwidth information;
content mode information stored in the memory, wherein the content mode information includes a determination of the level of detail of navigation information available to the system, wherein the determination of the level of navigation information available to the system is based on the bandwidth information;
wherein the content mode information includes a selected level of detail;
wherein the navigation information is received from a remote system in communication with the system via the wireless communications network;
wherein the OBU is configured to transfer the content mode information to the remote system via the wireless communication link;
wherein the navigation information has been prepared according to the content mode information, the navigation information including two levels of detail;
the display configured to display the navigation information received from the remote system as a map showing a route and an indicia placed on the map, the indicia representing a motor vehicle;
the map having a first region that displays a first level of detail, a second region that displays a second level of detail, and a third region with a third level of detail, wherein the first level of detail is greater than the second level of detail and the second level of detail is greater than the third level of detail;
the map including major map features and a plurality of categories of minor map features, wherein the first region includes the route, the major map features and all of the plurality of categories of minor map features, the second region includes the major map features and less than all of the plurality of categories of minor map features, and the third region includes no map features;
the display having a first condition wherein the indicia is in the first region proximate the route; and
the display having a second condition wherein the indicia is spaced from the route and the indicia is permitted to enter the second region and wherein a modification is made to keep the route and the indicia on the display.

19. The system according to claim 18, wherein the indicia remains at a substantially fixed position with respect to the first region.

20. The system according to claim 19, wherein the modification includes moving the indicia from the substantially fixed position.

21. The system according to claim 18, wherein the modification includes a change in a map scale.

22. The system according to claim 18, wherein the determination of the level of navigation information available to the system is based on a user subscription level.

* * * * *